United States Patent [19]

Horie

[11] Patent Number: 5,440,141

[45] Date of Patent: Aug. 8, 1995

[54] METHOD OF MEASURING A THICKNESS OF A MULTILAYERED SAMPLE USING ULTRAVIOLET LIGHT AND LIGHT WITH WAVELENGTHS LONGER THAN ULTRAVIOLET

[75] Inventor: Masahiro Horie, Kamikyo, Japan

[73] Assignee: Dainippon Screen Mfg. Co., Ltd., Kyoto, Japan

[21] Appl. No.: 289,320

[22] Filed: Aug. 11, 1994

[30] Foreign Application Priority Data

Aug. 20, 1993 [JP] Japan .................................. 5-227962

[51] Int. Cl.⁶ .......................... G01N 21/86; G01V 9/04
[52] U.S. Cl. ................................ 250/559.27; 356/357; 250/226
[58] Field of Search ................ 250/560, 226; 356/357, 356/358, 382

[56] References Cited

U.S. PATENT DOCUMENTS

| | | | |
|---|---|---|---|
| 4,645,349 | 2/1987 | Tabata | 356/382 |
| 4,984,894 | 1/1991 | Kondo | 356/382 |
| 4,988,198 | 1/1991 | Kondo | 356/357 |
| 4,999,509 | 3/1991 | Wada et al. | |
| 5,120,966 | 6/1992 | Kondo | 250/372 |
| 5,358,333 | 10/1994 | Schmidt et al. | 374/7 |

FOREIGN PATENT DOCUMENTS

2-287106  11/1990  Japan .

Primary Examiner—David C. Nelms
Assistant Examiner—Stephen Calogero
Attorney, Agent, or Firm—Ostrolenk, Faber, Gerb & Soffen

[57] ABSTRACT

Spectral reflection ratios with respect to a second wavelength range are obtained and Fourier transformed to derive frequency converted spectrum. A power spectrum is obtained from the frequency converted spectrum to identify a peak which expresses interference caused by a silicon film. An approximate value $d2'$ of the film thickness of the silicon film is calculated based on the peak position. After filtered by low-pass filtering, the frequency converted spectrum is reverse Fourier transformed to obtain spectral reflectance. From the spectral reflectance, theoretical spectral reflection ratios which are theoretically derived on only one transparent film of the thickness $d3$ which is formed on a silicon layer are subtracted. An approximate value $d1'$ of the thickness of a silicon oxide film is then calculated from the spectral reflectance which are obtained by subtraction.

7 Claims, 15 Drawing Sheets

METHOD OF MEASURING A THICKNESS OF A MULTILAYERED SAMPLE USING ULTRAVIOLET LIGHT AND LIGHT WITH WAVELENGTHS LONGER THAN ULTRAVIOLET

BACKGROUND OF THE INVENTION

1. Field of the Invention

The present invention relates to a non-contact, non-destructive measurement method of measuring film thicknesses of a multilayered sample object in which one or two transparent films are disposed on an SOI substrate which is formed by a body, a transparent insulation film and a monocrystalline or polycrystalline silicon film.

2. Description of the Background Art

In recent years, fabrication of an LSI on an SOI substrate has been becoming popular. FIGS. 15 and 16 are cross sectional views each showing an SOI substrate which serves as background of the present invention. In FIGS. 15 and 16, a silicon oxide film (transparent insulation film) 1 is formed on a silicon body B and a monocrystalline silicon film 2 is formed on the silicon oxide film 1, thereby constituting an SOI substrate 10. As compared with a conventional LSI (which is build on a bulk semiconductor substrate), an LSI built on the SOI substrate 10 has better device characteristics.

However, as fabrication of an LSI on an SOI substrate requires increasingly more complex, control of film thicknesses needs be more accurate than never. In some cases, thicknesses d1 and d2 of the silicon oxide film 1 and the silicon film 2 which are formed on the silicon body B need be measured. In other cases where one or two transparent films which are to be formed on the SOI substrate 10 during fabrication of an LSI, it is necessary to measure thicknesses d3 and d4 of these transparent films during the fabrication (For example, a silicon oxide film 3 needs be formed in FIG. 15 and a silicon oxide film 3 and a silicon nitride film 4 need be formed FIG. 16). Further, the need for measurement of the thicknesses d1 to d4 at the same time is mounting. Of course, measurement of the thicknesses d1 to d4 must be non-contact and non-destructive since the thicknesses must be measured during fabricating of an LSI.

Despite such needs, non-contact and non-destructive measurement of the respective thicknesses of the multilayered samples of FIGS. 15 and 16 is difficult. In reality, there has been no choice but to measure the thicknesses by destructing the multilayered sample object and observing the destructed sample object with an electron microscope etc.

To improve the situation, techniques for measuring the thickness of each layer of a multilayered sample object have been proposed as that disclosed by U.S. Pat. No. 4,999,509. According to the disclosed technique, a film thickness range of each layer is inputted in advance and the thicknesses of the respective layers are measured using a global optimization method and a local optimization method.

The measurement of film thicknesses according to the U.S. Pat. No. 4,999,509, however, is not convenient for an operator since the operator must input a film thickness range of each layer in advance to perform the global optimization method. Although this disadvantage can be overcome by setting the film thickness ranges wide enough, expansion of the ranges leads to an increase in the number of computation steps, which in turn considerably extends a computation time. In addition, since a value calculated as a result of optimization largely varies depending on a starting point of optimization (i.e., the value of a film thickness of each layer) and other optimization parameters, a reproduction accuracy of measurement greatly drops depending on setting conditions.

SUMMARY OF THE INVENTION

In a first aspect of the present invention, in a method of measuring thicknesses d1, d2 and d3 of a transparent insulation film, a silicon film and a transparent film, respectively, of a multilayered sample object which is formed by disposing the transparent film on an SOI substrate which is comprised of a body, the transparent insulation film and the silicon film, the method comprises: a first step of irradiating the multilayered sample object with light of first and second wavelength ranges to thereby measure spectral reflectance, the first wavelength range being a ultraviolet range, the second wavelength range including longer wavelengths than the ultraviolet range; a second step of calculating the thickness d3 of the transparent film from the measured spectral reflectance of the first wavelength range; a third step of calculating reflectance against wave numbers at equal wave number intervals from the measured spectral reflectance of the second wavelength range, and frequency converting the calculated reflectance to thereby develop a frequency converted spectrum; a fourth step of obtaining a power spectrum from the frequency converted spectrum to find a peak which expresses interference caused by the silicon film in the power spectrum, and calculating an approximate value d2' of the thickness of the silicon film based on the location of the peak and an average refractive index of silicon in a wave number space; a fifth step of eliminating periodic components corresponding to a certain effective optical path or longer paths in the frequency converted spectrum by low-pass filtering to thereby obtain a filtered frequency converted spectrum, then calculating intermediate spectral reflectance against wavelengths at equal wavelength intervals from the filtered frequency converted spectrum, then theoretically deriving theoretical spectral reflectance of when only the transparent film of the thickness d3 is formed on a silicon layer, the thickness d3 being a value which is calculated at the second step, then subtracting the theoretical spectral reflectance from the intermediate spectral reflectance to thereby obtain final spectral reflectance for the second wavelength range and then calculating an approximate value d1' of the thickness of the transparent insulation film from the final spectral reflectance; a sixth step of changing the thicknesses d1 and d2 from the approximate values d1' and d2' each by a fixed amount and calculating deviations between the theoretical spectral reflectance and the measured spectral reflectance with respect to the thicknesses d1, d2 and d3 to thereby find a combination (d1, d2) having the minimum deviation, the thickness d3 being a value which is calculated at the second step; and a seventh step of performing nonlinear optimization on the thicknesses d1 and d2 of the combination (d1, d2) which is found at the sixth step, thereby finally determining the thicknesses d1 and d2 as the thicknesses of the transparent insulation film and the silicon film.

In a second aspect of the present invention, preferably, the method of the first aspect further comprises an eighth step of increasing or decreasing the thicknesses d1 and d2 each by a predetermined amount to tentatively determine six or more different combinations (d1, d2, d3) of the thicknesses, calculating deviations between the theoretical spectral reflectance and the measured spectral reflectance with respect to the six or more combinations, approximating the deviations by quadratic surface approximation utilizing the least square method to develop a quadratic surface function, and thereby finding and determining the thicknesses d1 and d2 which allow the deviation to be minimum as the thicknesses of the transparent insulation film and the silicon film, wherein the eighth step is repeated until the deviation between the theoretical spectral reflectance with respect to the thicknesses d1 and d2 calculated at the eighth step and the thickness d3 calculated at the second step and the measured spectral reflectance calculated at the first step becomes smaller than a certain value.

In a third aspect of the present invention, in a method of measuring thicknesses d1, d2, d3 and d4 of a transparent insulation film, a silicon film and first and second transparent films, respectively, of a multilayered sample object which is formed by disposing the first and the second transparent films in this order on an SOI substrate which is comprised of a body, the transparent insulation film and the silicon film, the method comprises: a first step of irradiating said multilayered sample object with light of first and second wavelength ranges to thereby measure spectral reflectance, said first wavelength range being a ultraviolet range, said second wavelength range including longer wavelengths than the ultraviolet range; a second step of calculating the sum of effective optical path lengths of said first and said second transparent films from the measured spectral reflectance of said first wavelength range to find the maximum values d3max and d4max of the thicknesses d3 and d4, then tentatively determining the thicknesses d1 and d2 both as zero, then changing the thicknesses d3 and d4 each by a fixed amount from zero to said maximum values d3max and d4max to calculate deviations between theoretical spectral reflectance and the measured spectral reflectance with respect to the thicknesses d1, d2, d3 and d4, then finding a combination (d3, d4) having the minimum deviation, and thereafter performing nonlinear optimization on the thicknesses d3 and d4 of said combination (d3, d4) and finally determining the thicknesses d3 and d4 as the thicknesses of said first and said second transparent films; a third step of calculating reflectance against wave numbers at equal wave number intervals from the measured spectral reflectance of said second wavelength range and frequency converting the calculated reflectance to thereby develop a frequency converted spectrum; a fourth step of obtaining a power spectrum from the frequency converted spectrum to find a peak which expresses interference caused by said silicon film in the power spectrum, and calculating an approximate value d2' of the thickness of said silicon film based on the location of the peak and an average refractive index of silicon in a wave number space; a fifth step of eliminating periodic components corresponding to a certain effective optical path or longer paths in the frequency converted spectrum by low-pass filtering to thereby obtain a filtered frequency converted spectrum, then calculating intermediate spectral reflectance against wavelengths at equal wavelength intervals from the filtered frequency converted spectrum, then theoretically deriving theoretical spectral reflectance of when only said transparent film of the thickness d3 is formed on a silicon layer, the thickness d3 being a value which is calculated at said second step, then subtracting the theoretical spectral reflectance from the intermediate spectral reflectance to thereby obtain final spectral reflectance for the second wavelength range and then calculating an approximate value d1' of the thickness of said transparent insulation film from the final spectral reflectance; a sixth step of changing the thicknesses d1 and d2 from said approximate values d1' and d2' each by a fixed amount, and calculating deviations between the theoretical spectral reflectance and the measured spectral reflectance with respect to the thicknesses d1, d2, d3 and d4 to thereby find a combination (d1, d2) having the minimum deviation; and a seventh step of performing nonlinear optimization on the thicknesses d1 and d2 of said combination (d1, d2) which is found at said sixth step, thereby finally determining the thicknesses d1 and d2 as the thicknesses of said transparent insulation film and said silicon film.

In a fourth aspect of the present invention, preferably, the method of the third aspect further comprises an eighth step of tentatively determining the thicknesses d3 and d4 both as zero, then increasing or decreasing the thicknesses d3 and d4 each by a predetermined amount to tentatively determine six or more different combinations (d1, d2, d3, d4) of the thicknesses, then calculating deviations between the theoretical spectral reflectance and the measured spectral reflectance with respect to the six or more combinations, then approximating the deviations by quadratic surface approximation utilizing the least square method to develop a quadratic surface function, and thereby finding and determining the thicknesses d3 and d4 which allow the deviation to be minimum as the thicknesses of the first and the second transparent films, wherein the eighth step is repeatedly performed after the second step and before the fourth step until the deviation between the theoretical spectral reflectance with respect to the thicknesses d1 and d2 which are both zero and the thicknesses d3 and d4 having such values which are calculated at the eighth step and the measured spectral reflectance calculated at the first step becomes smaller than a certain value.

In a fifth aspect of the present invention, method of the third aspect may alternatively further comprise a ninth step of increasing or decreasing the thicknesses d1 and d2 each by a predetermined amount to tentatively determine six or more different combinations (d1, d2, d3) of the thicknesses, then calculating deviations between the theoretical spectral reflectance and the measured spectral reflectance with respect to the six or more combinations, then approximating the deviations by quadratic surface approximation utilizing the least square method to develop a quadratic surface function, and thereby finding and determining the thicknesses d1 and d2 which allow the deviation to be minimum as the thicknesses of the transparent insulation film and the silicon film, wherein the ninth step is repeated until the deviation between the theoretical spectral reflectance with respect to the thicknesses d1 and d2 calculated at the ninth step and the thicknesses d3 and d4 calculated at the second step and the measured spectral reflectance calculated at the first step becomes smaller than a certain value.

As described above, in the first aspect of the present invention, light of the first and the second wavelength ranges is irradiated upon the multilayered sample object and the spectral reflectance are measured. The thickness d3 of the transparent film is calculated from the measured spectral reflectance of the first wavelength range. Since most of light of the first wavelength range is absorbed by the silicon film which is disposed just under the transparent film, the spectral reflectance of the first wavelength range express the influence of the thickness d3 alone but not the influence of the underling layer structure including the silicon film. Hence, the thickness d3 of the transparent film is accurately calculated.

In calculating the thicknesses d1 and d2 of the transparent insulation film and the silicon film, the approximate valued d1' and d2' of the thicknesses d1 and d2 are calculated by frequency analysis. This eliminates the conventional need to input the film thickness ranges prior to measurement of the thicknesses. This also reduces the number of the necessary computation steps, whereby a computation time is substantially shortened.

Low-pass filtering is performed in calculating the approximate value d1' of the thickness of the transparent insulation film, followed by elimination of the spectrum components of the transparent film having the thickness d3. Hence, even if the transparent film and the transparent insulation film are of the same material and of approximately the same thickness, the spectrum components of the transparent insulation film are accurately separated from the other spectrum components. For this reason, it is possible to calculate the approximate value d1' of the thickness of the transparent insulation film even under such condition (i.e., even if the transparent film and the transparent insulation film are of the same material and of approximately the same thickness).

While changing the thicknesses d1 and d2 of the transparent insulation film and the silicon film respectively from the approximate valued d1' and d2' each by a fixed amount, deviations between the theoretical spectral reflectance and the measured spectral reflectance with respect to the varying thicknesses d1, d2 and d3 are computed. A combination (d1, d2) which allows the deviation to be minimum is identified. The values d1 and d2 of the identified combination are optimized by nonlinear optimization. The thicknesses thus optimized are finally determined as the thicknesses d1 and d2 of the transparent insulation film and the silicon film. Thus, calculation of the thicknesses d1 and d2 is quite accurate.

In the second aspect of the present invention, a combination (d1, d2) of the thicknesses of the transparent insulation film and the silicon film is found by quadratic surface approximation utilizing the least square method. Hence, calculation of the thicknesses d1 and d2 of the transparent insulation film and the silicon film is even more accurate.

In the third aspect of the present invention, light of the first and the second wavelength ranges is irradiated upon the multilayered sample object and the spectral reflectance are measured. From the measured spectral reflection ratios of the first wavelength range, the sum of effective optical path lengths of the thicknesses d3 and d4 of the first and the second transparent films is calculated, and the maximum values d3max and d4max of the thicknesses d3 and d4 are then found, respectively. Having tentatively determined the thicknesses d1 and d2 both as zero, the thicknesses d3 and d4 are each changed by a fixed amount from zero in order to the maximum values d3max and d4max to calculate deviations between the theoretical spectral reflectance and the measured spectral reflectance with respect to the thicknesses d1, d2, d3 and d4. A combination (d3, d4) which allow the deviation to be minimum is then found. The thickness values of the identified combination are optimized by nonlinear optimization, and the optimized thicknesses are finally determined as the thicknesses d3 and d4 of the first and the second transparent films.

In the third aspect of the present invention, the thicknesses d1 and d2 of the transparent insulation film and the silicon film are calculated in approximately the same manner as in the first aspect of the present invention.

In the fourth aspect of the present invention, after calculating the thicknesses d3 and d4 of the first and the second transparent films at the second step, an appropriate combination (d3, d4) of the thicknesses of the first and the second transparent films is identified by quadratic surface approximation utilizing the least square method. Hence, calculation of the thicknesses d3 and d4 of the first and the second transparent films is very accurate.

The fifth aspect of the present invention is similar to the second aspect of the present invention in that an appropriate combination (d1, d2) of the thicknesses of the transparent insulation film and the silicon film is identified by quadratic surface approximation utilizing the least square method. Hence, calculation of the thicknesses d1 and d2 of the transparent insulation film and the silicon film is even more accurate.

As described above, according to the present invention, the thicknesses d1 and d2 of the transparent insulation film and the silicon film are calculated from the approximate valued d1' and d2' which are calculated by frequency analysis. This eliminates a need to input the film thickness ranges prior to measurement of the thicknesses, and reduces the number of the necessary computation steps, thereby substantially shortening a computation time.

Accordingly, it is an object of the present invention to offer a method of measuring thicknesses of layers of a multilayered sample object in which one or two transparent films are disposed on an SOI substrate without increasing the number of computation steps and without pre-measurement inputting of data.

These and other objects, features, aspects and advantages of the present invention will become more apparent from the following detailed description of the present invention when taken in conjunction with the accompanying drawings.

DESCRIPTION OF THE PREFERRED EMBODIMENTS

A. Structure of Film Thickness Measurement Apparatus

Figure 1:
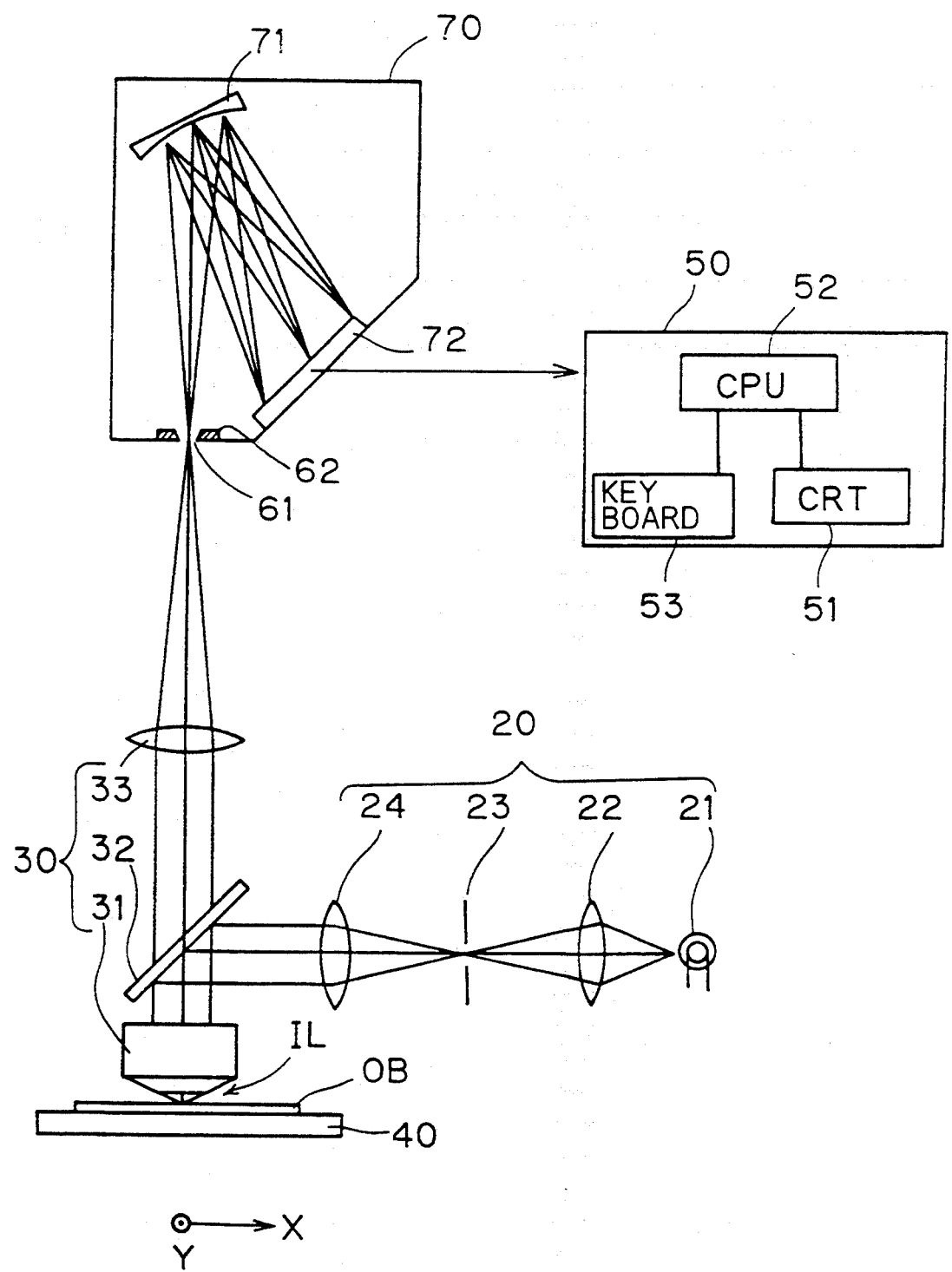
FIG. 1 is a view of a film thickness measurement apparatus to which a film thickness measurement method of the present invention is applicable.

FIG. 1 is a view of a film thickness measurement apparatus to which a film thickness measurement method of the present invention is applicable. The film thickness measurement apparatus comprises an illumination optical system 20 and an imaging optical system 30. The illumination optical system 20 includes a light source 21 which is formed by a halogen lamp and a deuterium lamp so as to emit light of a ultraviolet range (hereinafter "first wavelength range") and light of a visible range to a near-infrared range (hereinafter "second wavelength range") including longer wavelengths than the ultraviolet range. Light from the light source 21 enters the imaging optical system 30 through a condenser lens 22, a field stop 23 and a condenser lens 24.

The imaging optical system 30 consists of an objective lens 31, a beam splitter 32 and a tube lens 33. Light from the illumination optical system 20 is reflected by the beam splitter 32 and irradiated upon a designated illumination position IL through the objective lens 31.

Figure 15:
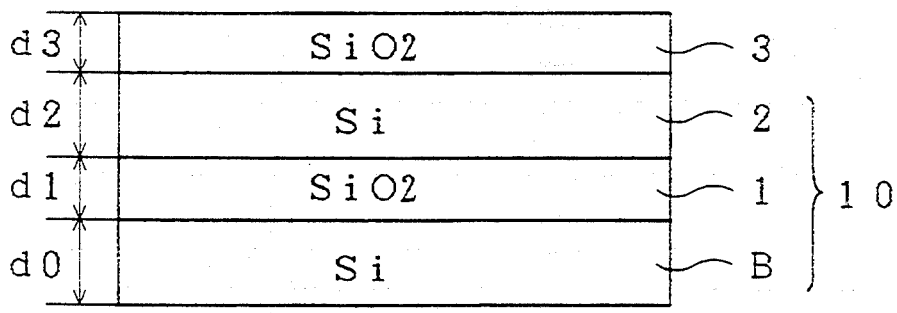
FIGS. 15 and 16 are cross sectional views of multilayered sample objects which serve as background of the present invention.

An XY stage 40 is disposed in the vicinity of the illumination position IL. The XY stage 40 mounts a multilayered sample object OB as those shown in FIGS. 15 and 16 in which the transparent films 3 and 4 are disposed on the SOI substrate 10. Moving in a direction X or in a direction Y in response to a control signal received from an XY stage driving circuit (not shown), the XY stage 40 registers a desired surface region of the multilayered sample object OB to the illumination position IL. Although not shown in FIG. 1, the XY stage 40 is equipped with means for detecting the position of the XY stage 40 (i.e., an X-coordinate and a Y-coordinate). The information about the position of the XY stage 40 is supplied to a control unit 50 which controls the apparatus as a whole.

Light reflected at the region of the multilayered sample object OB (film thickness measurement region) which is registered to the illumination position IL is converged to a designated point on an optical axis through the objective lens 31, the beam splitter 32 and the tube lens 33. A plate 62 having a pin hole 61 in the center is disposed in the vicinity of the light convergent position. Of the reflected light, light passing through the pin hole 61 is allowed into a spectroscopic unit 70.

The spectroscopic unit 70 is comprised of a concave diffraction grating 71 for separating the reflected light into spectrum components and an optical detector 72 for detecting spectrum components of the diffracted light. The optical detector 72 is formed by a photo diode array or a CCD, for example, and is disposed in optical conjugation with the pin hole 61. Hence, light received by the spectroscopic unit 70 is separated into spectrum components by the concave diffraction grating 71, and spectral signals corresponding to the energies of relevant spectrum components are provided to the control unit 50 from the optical detector 72. In the control unit 50, thicknesses of a plurality of thin films which are formed in the multilayered sample object OB (e.g., the silicon oxide film 1, the silicon film 2, the silicon oxide film 3 and the silicon nitride film 4) are measured in accordance with the spectral signals by a method which will be described later. The control unit 50 then outputs measurements to a CRT 51.

As shown in FIG. 1, the control unit 50 comprises a conventional CPU 52 which performs logic computations. A signal is transmitted between the CPU 52 and the CRT 51 and a key board 53 through an input/output port not shown.

B. Operation of Film Thickness Measurement Apparatus (Procedures of Measurement)

Figure 2:
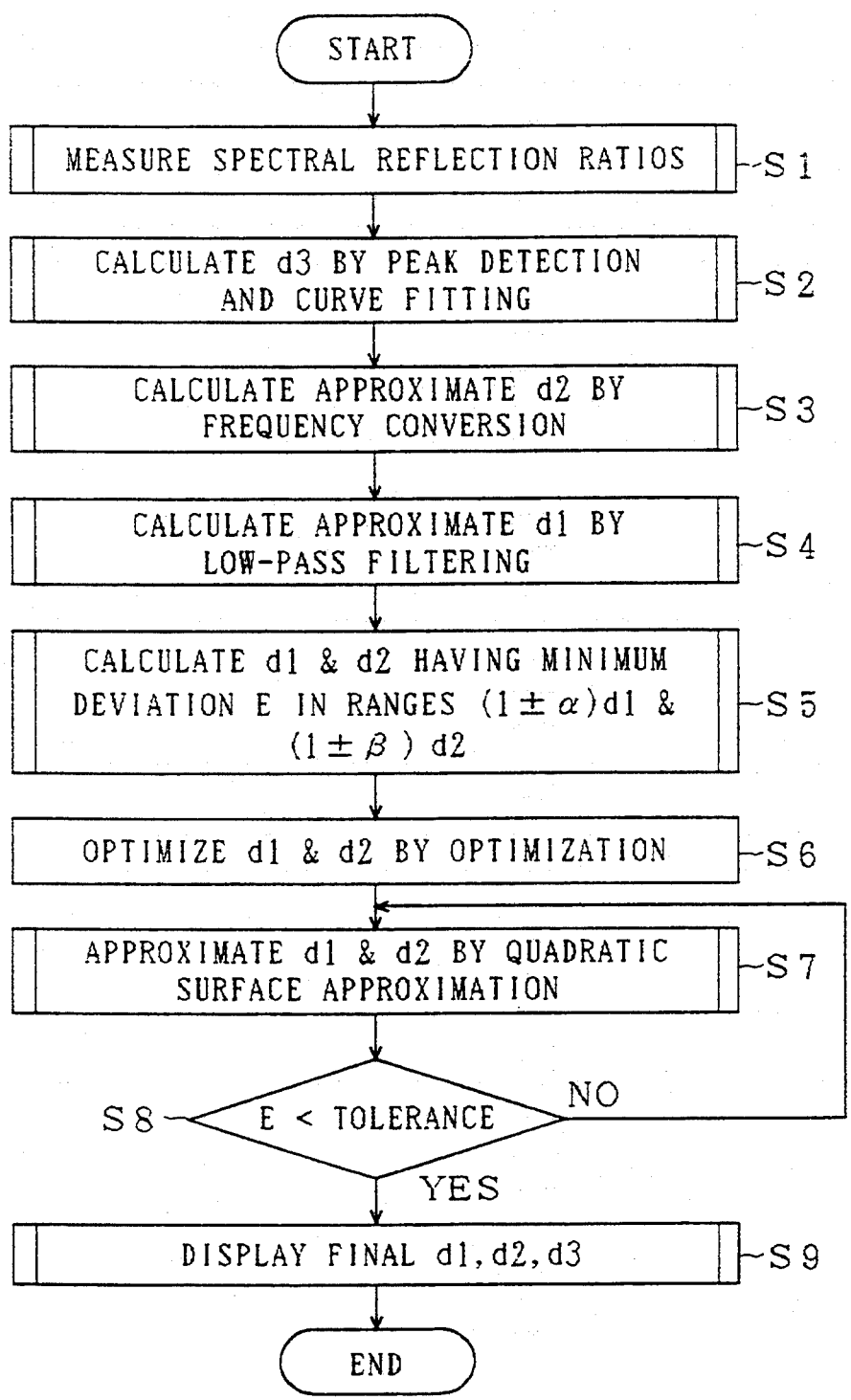
FIG. 2 is a flow chart showing a method of measuring a film thickness of a multilayered sample object according to a preferred embodiment of the present invention.

FIG. 2 is a flow chart showing a method of measuring a film thickness of a multilayered sample object according to a preferred embodiment of the present invention. A method of measuring thicknesses d1, d2 and d3 of a multilayered sample object OB in which the silicon oxide film 3 is formed on the SOI substrate 10 (See FIG. 15) will be hereinafter described with reference to FIG. 2.

Figure 3:
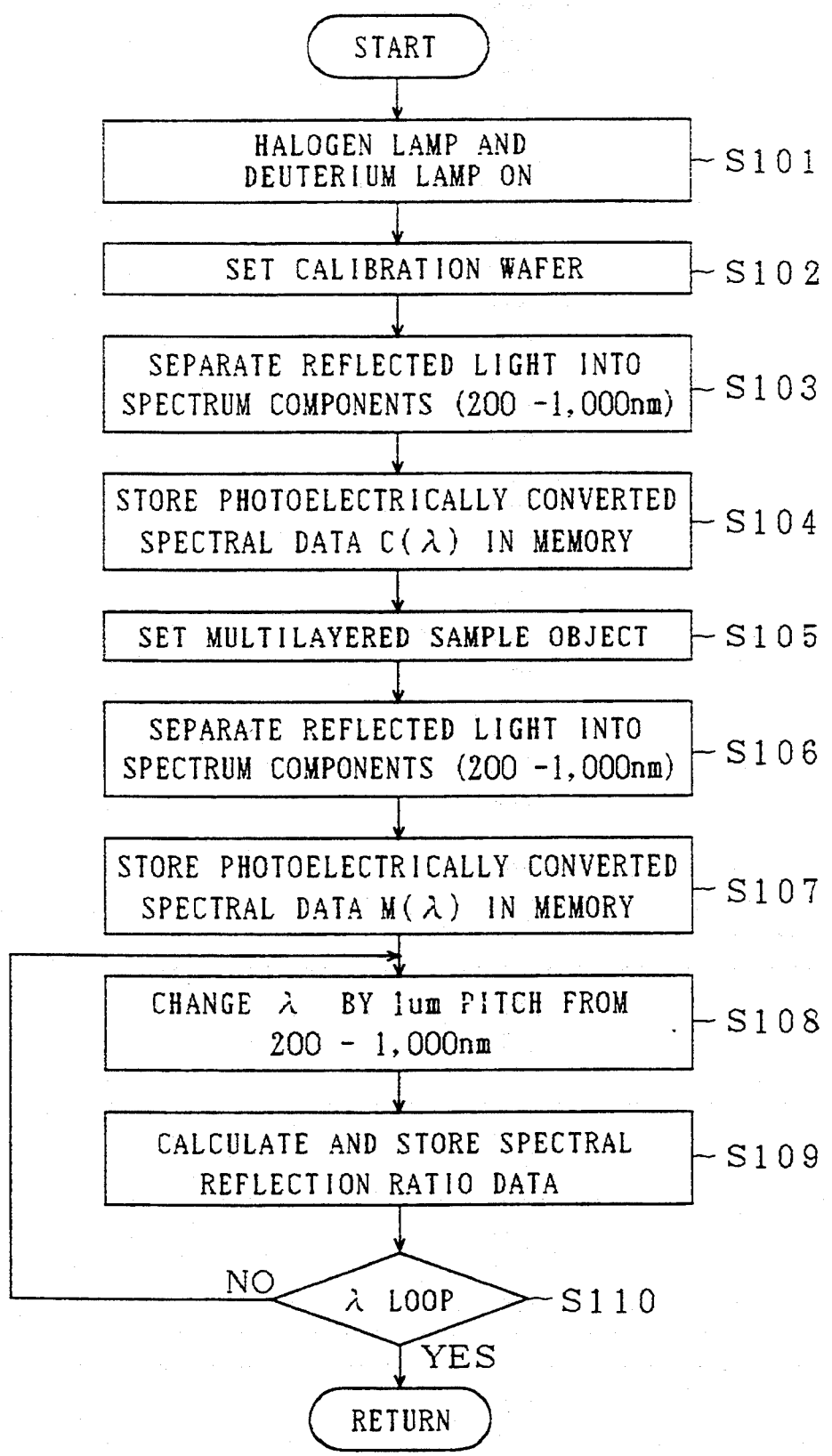
FIG. 3 is a flow chart showing steps for measuring spectral reflection ratios of a multilayered sample object.

(1) At Step S1, reflection ratios Rm ($\lambda$) of the multilayered sample object OB on the basis of a calibration wafer (i.e., silicon substrate) with respect to wavelengths from 200 nm to 1,000 nm are measured. More specifically, measurement is performed as follows as shown in FIG. 3. First, at Step S101, the halogen lamp and the deuterium lamp of the light source 21 are turned on.

Next, at Step S102, an operator sets the calibration wafer on the XY stage 40 causing light to be reflected by the calibration wafer and converged to a designated point on an optical axis through the objective lens 31, the beam splitter 32 and the tube lens 33. Only light passed through the pin hole 61 of the plate 62 are allowed into the spectroscopic unit 70 and separated into spectrum components within a wavelength range from 200 nm to 1,000 nm (Step S103). At Step S104, light entered the optical detector 72 is photoelectrically converted into spectral signals which will be supplied to the control unit 50 and stored as spectral data C ($\lambda$) in a memory (not shown) of the control unit 50.

Following this, the operator detaches the calibration wafer from the XY stage 40 and places the multilayered sample object OB which is to be measured on the XY stage 40 (Step S105). In the same manner as above, light reflected by the multilayered sample object OB is guided into the spectroscopic unit 70, is separated into spectrum components within the wavelength range from 200 nm to 1,000 nm (Step S106) and stored as spectral data M ($\lambda$) in the memory of the control unit 50 (Step S107).

Then, Steps S108 to S110 are repeated to read the spectral data C (λ) and M (λ) for every 1 nm within the wavelength range from 200 nm to 1,000 nm and to calculate the reflection ratios Rm (λ) from Eq. 1 below:

$$Rm(\lambda) = \frac{M(\lambda)}{C(\lambda)} \times 100(\%) \tag{1}$$

Data about the calculated reflection ratios (hereinafter "spectral reflection ratio data") are stored in the memory (Step S109).

Figure 4:
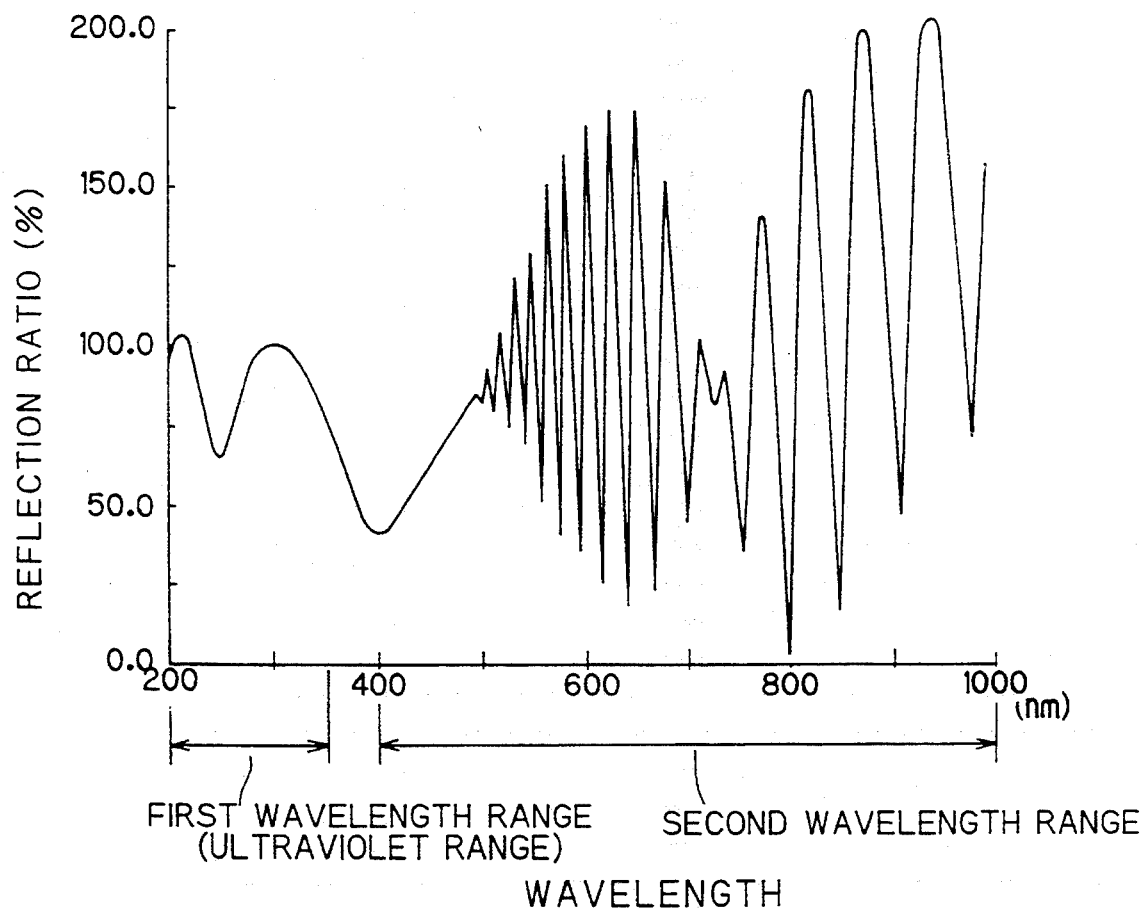
FIG. 4 is a view showing the spectral reflection ratios measured at the steps of FIG. 3.

FIG. 4 shows an interference waveform obtained by plotting the reflection ratios Rm (λ) of the multilayered sample object OB with respect to the wavelengths from 200 nm to 1,000 nm thus calculated against a wavelength λ.

(2) Proceeding to Step S2 (FIG. 2), from the spectral reflection ratios Rm (λ) of the first wavelength range, the thickness d3 of the silicon oxide film 3 which is formed on the SOI substrate 10 is calculated by a conventional peak detection technique and the known curve fit method. Most of light belonging to the first wavelength range is absorbed by the silicon film 2 which is formed just under the silicon oxide film 3 so that the spectral reflection ratios Rm (λ) of the first wavelength range express the influence of the thickness d3 alone but not the influence of the underling layer structure including the silicon film 2. Hence, as described below, the thickness d3 of the silicon oxide film 3 can be accurately calculated by the peak detection technique and the curve fit method.

Figure 5:
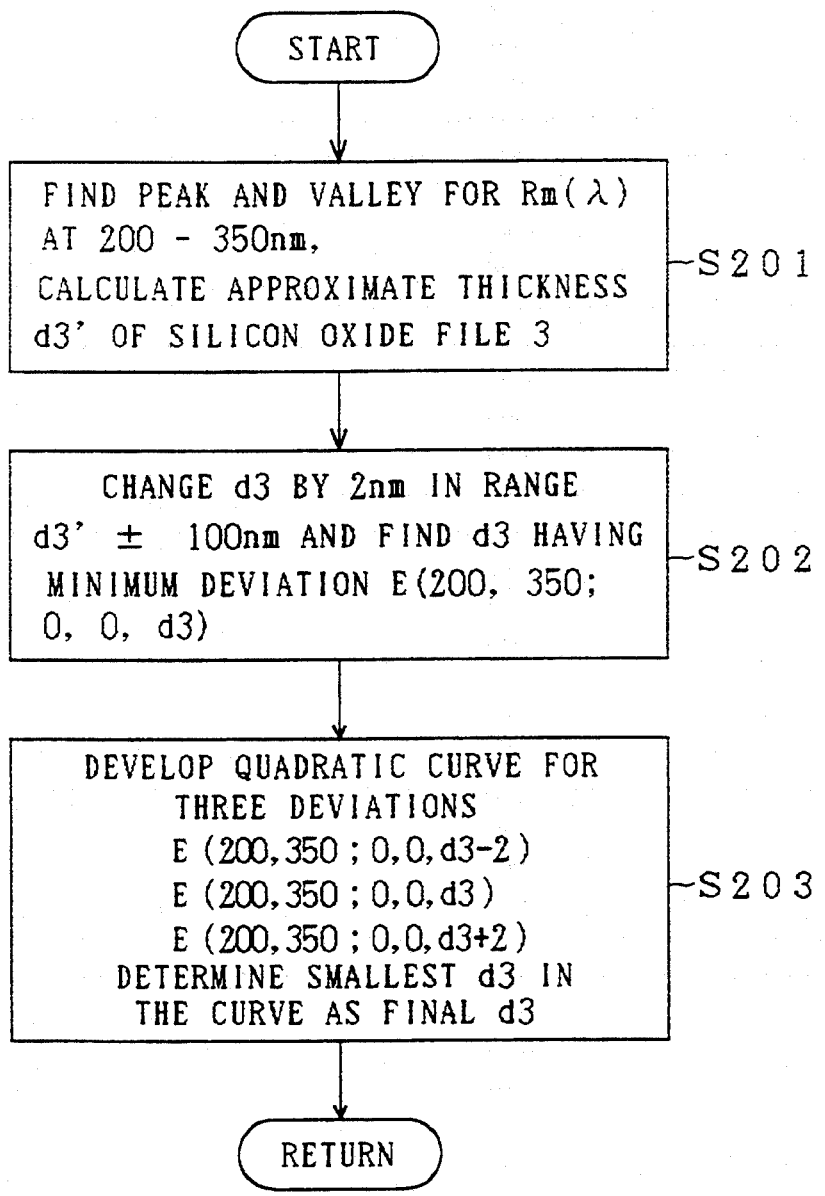
FIG. 5 is a flow chart showing computation steps for calculating the thickness d3 of a silicon oxide film.

FIG. 5 is a flow chart showing computation steps for calculating the thickness d3 of the silicon oxide film 3. First, at Step S201, a peak and a valley of the reflection ratios Rm (λ) of the first wavelength range (200 nm to 350 nm) are found. From Eq. 2 below, an approximate value d3' of the thickness d3 of the silicon oxide film 3 is calculated.

$$d3' = 0.25 \times \frac{m-1}{\frac{n1}{w1} - \frac{n2}{w2}} \tag{2}$$

where w1: the wavelength of a peak (or a valley) of the shorter wavelength side
w2: the wavelength of a peak (or a valley) of the longer wavelength side
m: the total number of the peaks and the valleys in the wavelength range (i.e., w1 to w2)
n1: the refraction index of the silicon oxide film (SiO$_2$) at the wavelength w1
n2: the refraction index of the silicon oxide film (SiO$_2$) at the wavelength w2

If the number of the peaks (valleys) is one or less, d3=0.

At the subsequent Step S202, the thickness d1 of the silicon oxide film 1 and the thickness d2 of the silicon film 2 are set zero. This is because most of light belonging to the first wavelength range is absorbed by the silicon film 2. Upon setting d1=d2=0, deviations E (200, 350: 0, 0, d3) are calculated by changing the thickness d3 of the silicon oxide film 3 by a fixed amount (e.g., by 2 nm) within a certain range (for example, d3'±100 nm) from the approximate value d3'. As herein termed, "deviations E" refer to deviations for evaluating differences between the reflection ratios Rm (λ) which are calculated based on actual measurements (hereinafter "measured reflection ratios Rm (λ)") and theoretically calculated reflection ratios Rc (λ). Where the wavelength range is from λ1 to λ2 and the thicknesses of the silicon oxide film 1, the silicon film 2 and the silicon oxide film 3 are d1 d2 and d3, respectively, a deviation E at λ1, λ2, d1, d2 and d3 is expressed as:

$$E(\lambda1, \lambda2; d1, d2, d3) = \sum_{\lambda=\lambda1}^{\lambda2} [W(\lambda) \times \{Rm(\lambda) - Rc(\lambda)\}^2] \tag{3}$$

In Eq. 3, W(λ) is a weight function. As W(λ), a weight function which is in proportion to an actual amount of received light can be used for instance. The theoretical reflection ratios Rc (λ) are calculated in a conventional way from refraction indexes n0 (λ), n1 (λ), n2 (λ) and n3 (λ) and absorption coefficients k0 (λ), k1 (λ), k2 (λ) and k3 (λ) of each layer of the multilayered sample object OB with respect to the respective wavelengths, the wavelength λ and the values tentatively determined as the film thicknesses d1, d2 and d3. This embodiment requires that the memory preliminarily stores the refraction indexes n0 (λ), n1 (λ), n2 (λ) and n3 (λ) and the absorption coefficients k0 (λ), k1 (λ), k2 (λ), and k3 (λ) of the silicon body B, the silicon oxide film 1, the silicon film 2 and the silicon oxide film 3 with respect to each wavelength so that it is possible to read these data whenever if necessary.

From the deviations calculated in the manner above, the thickness d3 from which the minimum deviation is calculated is identified. Further, the deviations E are again calculated by substituting values (d3−2 nm), d3 and (d3+2 nm) in Eq. 4 below to develop a quadratic curve. The smallest value E of the resulting quadratic curve is identified and the corresponding value d3 is finally determined as the thickness d3 of the silicon oxide film 3.

$$E = A \times (d3)^2 + B \times (d3) + C \tag{4}$$

where A, B and C are constants.

(3) Next, at Step S3 (FIG. 2), the measured reflection ratios Rm (λ) are frequency converted, and an approximate value d2' of the thickness d2 of the silicon film 2 is calculated from a peak position and a corresponding refraction index of the converted data.

Figure 6:
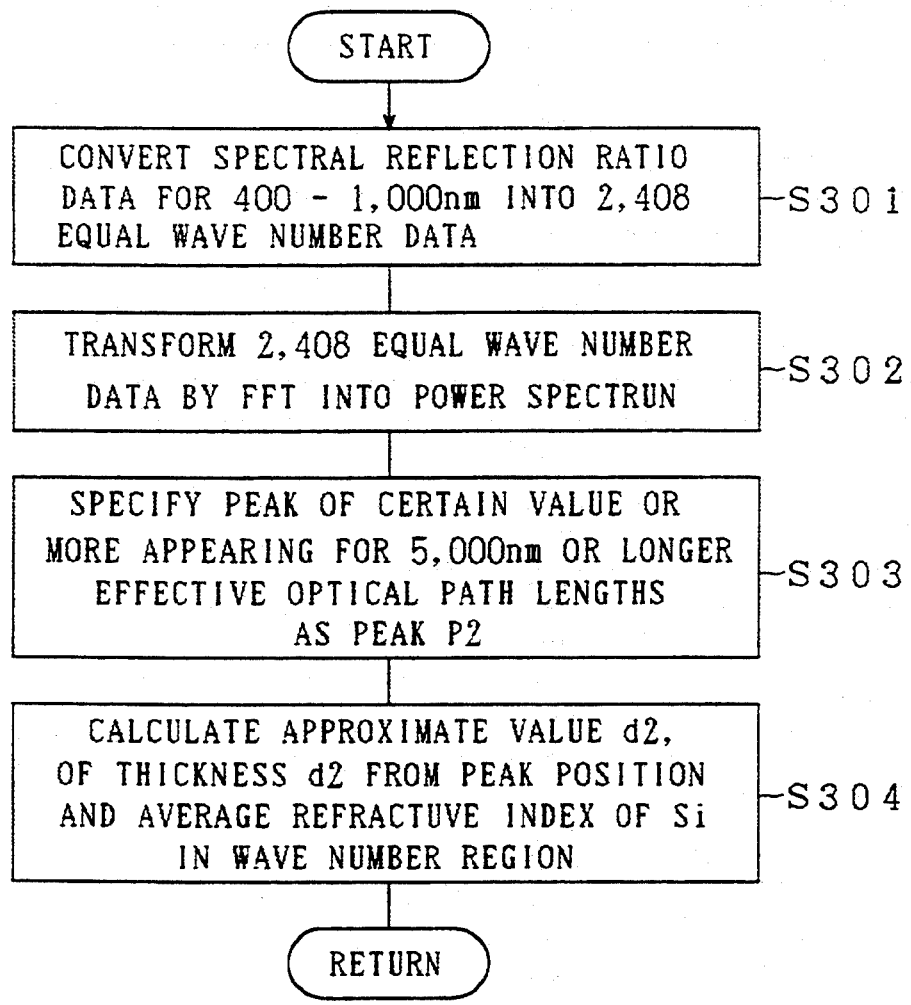
FIG. 6 is a flow chart showing computation steps for calculating an approximate value d2' of the thickness of a silicon film from the measured reflection ratios.

FIG. 6 is a flow chart showing computation steps for calculating the approximate value d2' of the thickness of the silicon film 2 from the measured reflection ratios Rm (λ). In the following, the computation steps will be described with reference to FIGS. 6 and 7.

First, the spectral reflection ratio data with respect to the second wavelength range (e.g., 400 nm to 1,000 nm) are read from the memory and converted into wave number data taken at equal wave number intervals (a wave number is an inverse number of a wavelength) (Step S301). This embodiment assumes that there are 2,048 converted data. If there is no spectral reflection ratio data which can be directly used as wave number data, the data which is obtained by interporating adjacent spectral reflection ratio data is used as desired wave number data.

Figure 7:
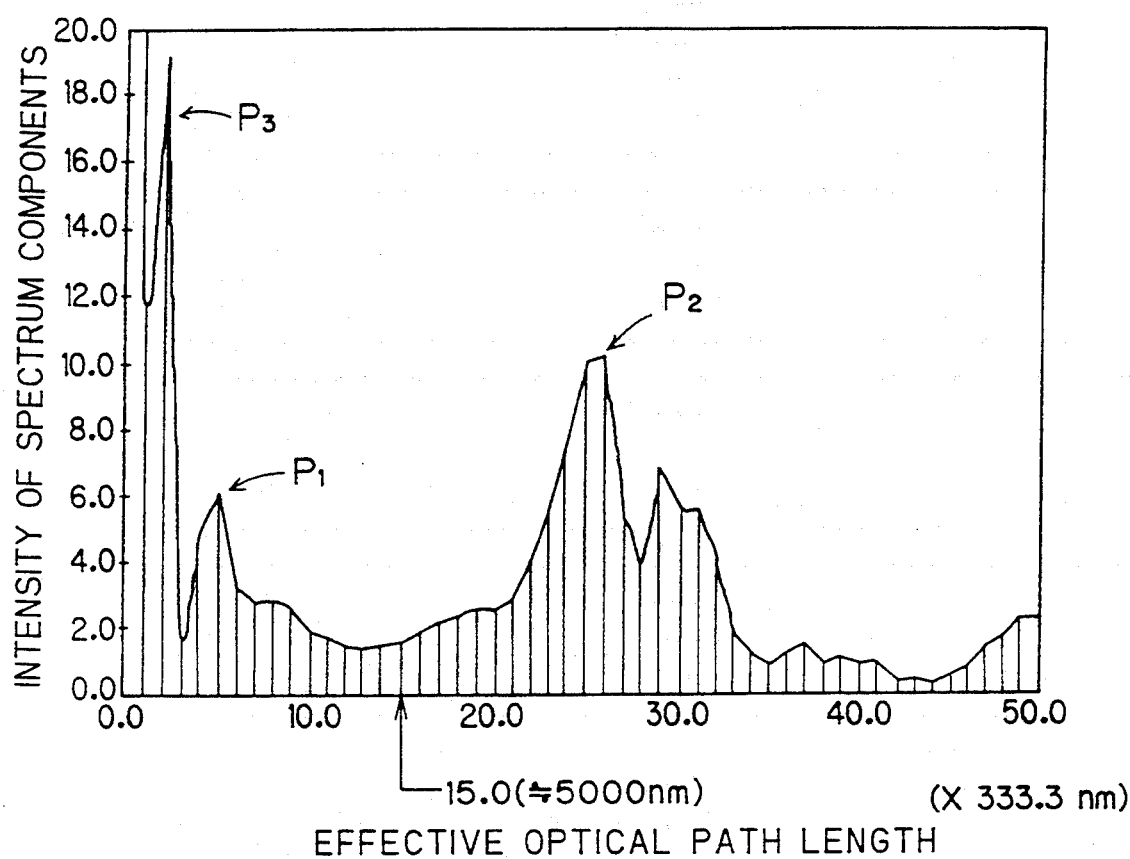
FIG. 7 is a view showing an example of a power spectrum.

Following this, an interference waveform in the wave number space thus calculated is Fourier transformed (FFT) to obtain a Fourier transform spectrum. From the Fourier transform spectrum, a power spectrum as that shown in FIG. 7 is derived by plotting the absolute values of the Fourier transform spectrum (Step S302). The horizontal axis of the waveform of the spectrum denotes an effective optical path length (=refraction index×film thickness) while the vertical axis denotes the intensity of the spectrum components. In the graph of FIG. 7, the power spectrum includes a plurality of peaks. Because of a correlation between the refraction index and the thickness of each layer, peaks P3 and P1 related to the silicon oxide films 3 and 1 appear in a region in which the effective optical path is short (i.e., the left-hand side of FIG. 7) while a peak P2 related to the silicon film 2 appears in a region in which the effective optical path is long. Therefore, in this embodiment, of sufficiently large peaks appearing for a certain effective optical path or longer paths (e.g., not less than 5,000 nm), a peak related to the shortest effective optical path is determined as the peak P2 regarding the silicon film 2 (Step S303).

Specifying the peak P2 as above, at Step S304, the effective optical path related to the peak P2 ($=n2 \times d2$) is divided by an average refractive index $<n2>$ of the silicon film 2 for the second wavelength region to thereby calculate the approximate value $d2'$ of the thickness of the silicon film 2.

Figure 8:
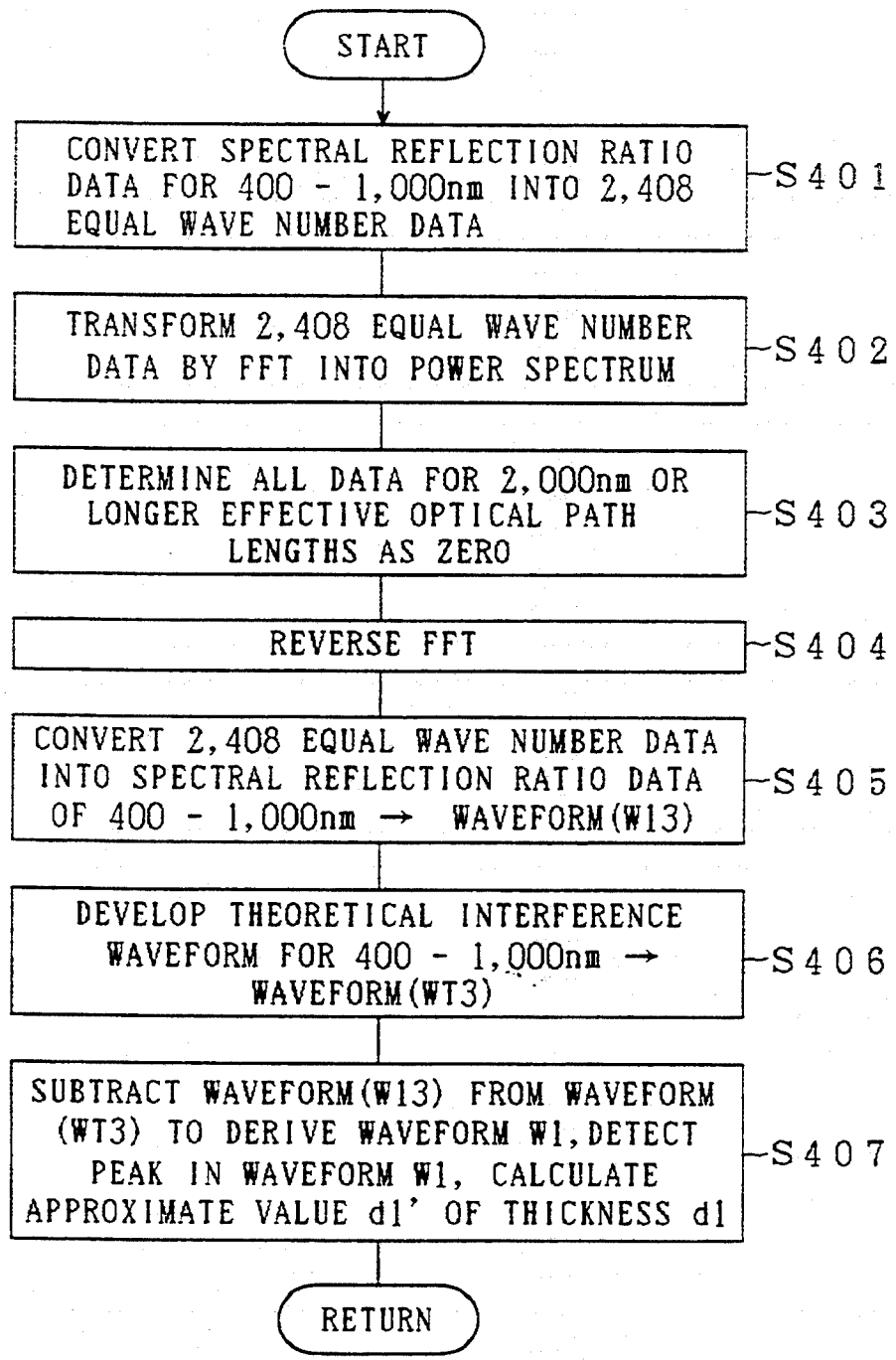
FIG. 8 is a flow chart showing computation steps for calculating an approximate value d1′ of the thickness of a silicon oxide film by low-pass filtering.

(4) Proceeding to Step S4 (FIG. 2), an approximate value $d1'$ of the thickness of the silicon oxide film 1 is calculated by low-pass filtering. More particularly, calculation follows computation steps shown in FIG. 8.

Figure 9:
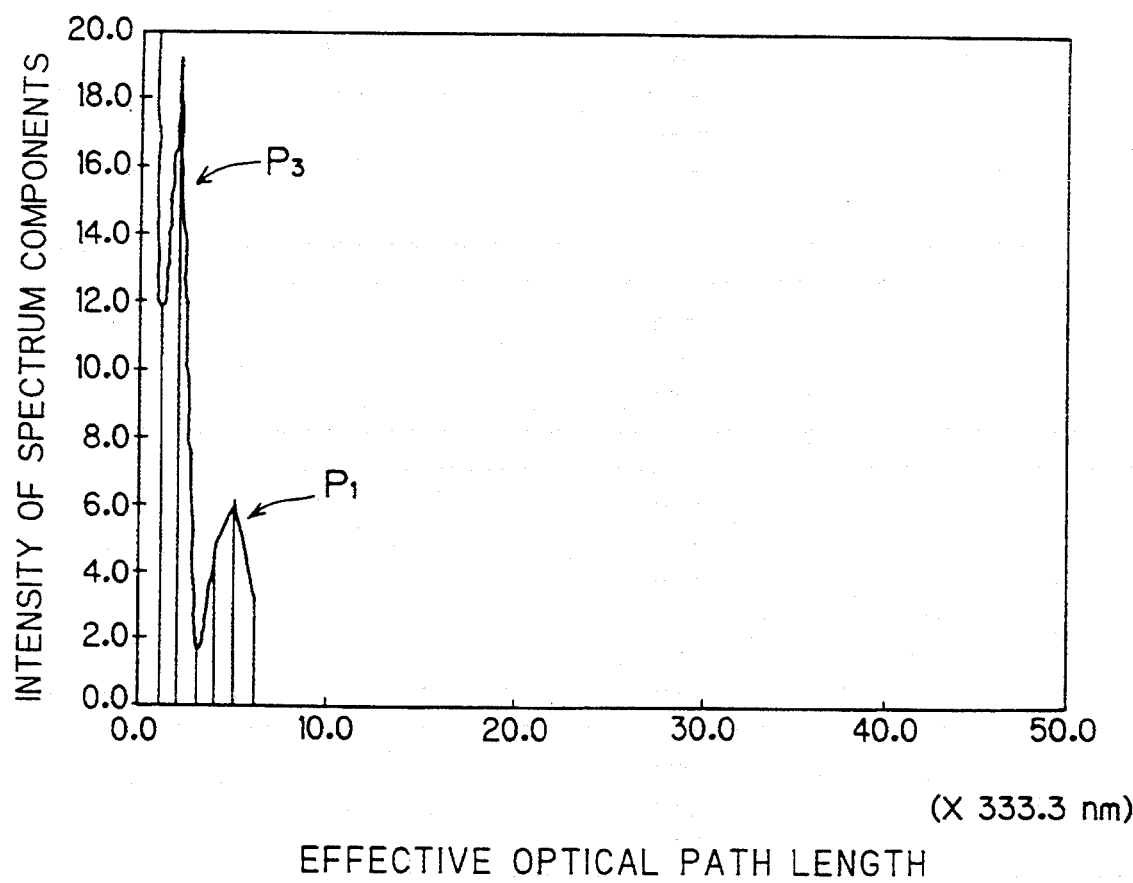
FIG. 9 is a view explaining low-pass filtering.

First, in a manner similar to the above, the spectral reflection ratio data with respect to the second wavelength range (e.g., 400 nm to 1,000 nm) are converted into wave number data which are taken at equal wave number intervals (Step S401), and then Fourier transformed to obtain a Fourier transform spectrum (Step S402). Of the Fourier transform spectrum developed at Step S402, all data (i.e., real parts as well as imaginary parts) corresponding to a certain effective optical path or over (e.g., not less than 2,000 nm) are zeroed by low-pass filtering at Step S403, thereby eliminating all spectrum components but components which correspond to the short effective optical paths, that is, components regarding the silicon oxide films 1 and 3 alone are left. As a result, a waveform as that shown in FIG. 9 is obtained (the spectrum is converted into the power spectrum for a convenience sake). Here, it is to be noted that instead of newly developing the spectral data by Fourier transformation, the Fourier transform spectral data developed and stored in the memory at Step S402 can be used.

Figure 10:
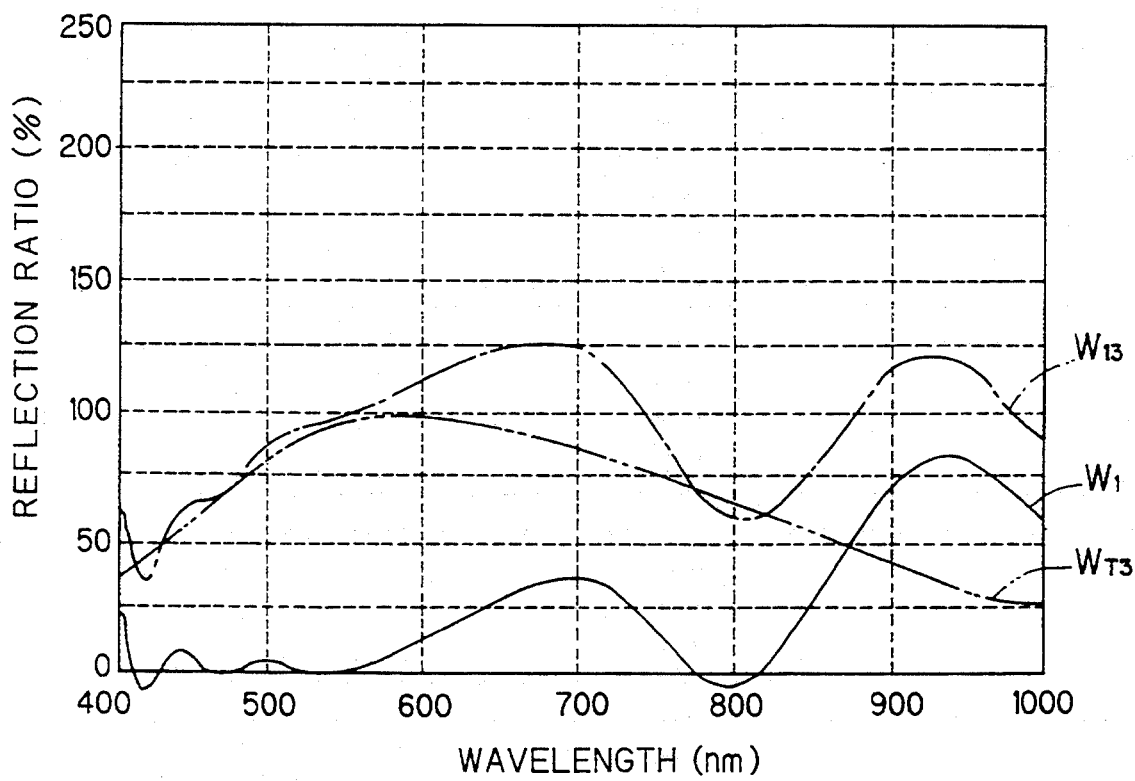
FIG. 10 is a view explaining a method of calculating the approximate value d1′ of the thickness of the silicon oxide film.

Following this, at Step S404, the filtered data are reverse Fourier transformed to develop wave number data taken at equal wave number intervals. The data thus obtained are then converted into data taken at equal wavelength pitches at Step S405 to thereby find spectral reflection ratio data for the second wavelength region (400 nm to 1,000 nm). The spectral reflection ratio data thus developed do not include interference components caused by the silicon oxide film 2. That is, the interference waveform W13 (dash-and-dot line of FIG. 10) is equivalent to combination of an interference waveform derived on the silicon oxide film 3 (having the thickness d3) which is formed on the SOI substrate 10 and an interference waveform derived on the silicon oxide film 1 (having the thickness d1) which forms the SOI substrate 10.

Then, at Step S406, a theoretical interference waveform WT3 (dash-and-double-dot line of FIG. 10) is computed which is expected from irradiation of light of the second wavelength region (400 nm to 1,000 nm) upon a sample which includes the silicon oxide film 3 of the thickness d3 on a silicon body. This computation is conventional computation and will not be described here.

Having developed the interference waveform W13 for the silicon oxide films 1 and 3 and the theoretical interference waveform WT3 for the silicon oxide 3, the theoretical interference waveform WT3 is subtracted from the interference waveform W13 at Step S407. As a result, an interference waveform W1 (solid line of FIG. 10) expressing only interference caused by the silicon oxide film 1 (which has the thickness d1) which forms the SOI substrate 10 is obtained.

Here, again by the peak detection technique, the approximate value $d1'$ of the thickness of the silicon oxide film 1 is calculated from the interference waveform W1 (Step S407).

(5) Next, at Step S5 (FIG. 2), by changing the thicknesses d1 and d2 of the silicon oxide film 1 and the silicon film 2 respectively by fixed amounts (film thickness pitches) $\Delta d1$ and $\Delta d2$ from the approximate values $d1'$ and $d2'$, deviations E between the theoretical and measured spectral reflection ratios are calculated with respect to the varying thicknesses d1, d2 and d3. From the calculated deviations E, a combination of the film thicknesses (d1, d2) which allows the deviation E to be minimum is identified.

Figure 11:
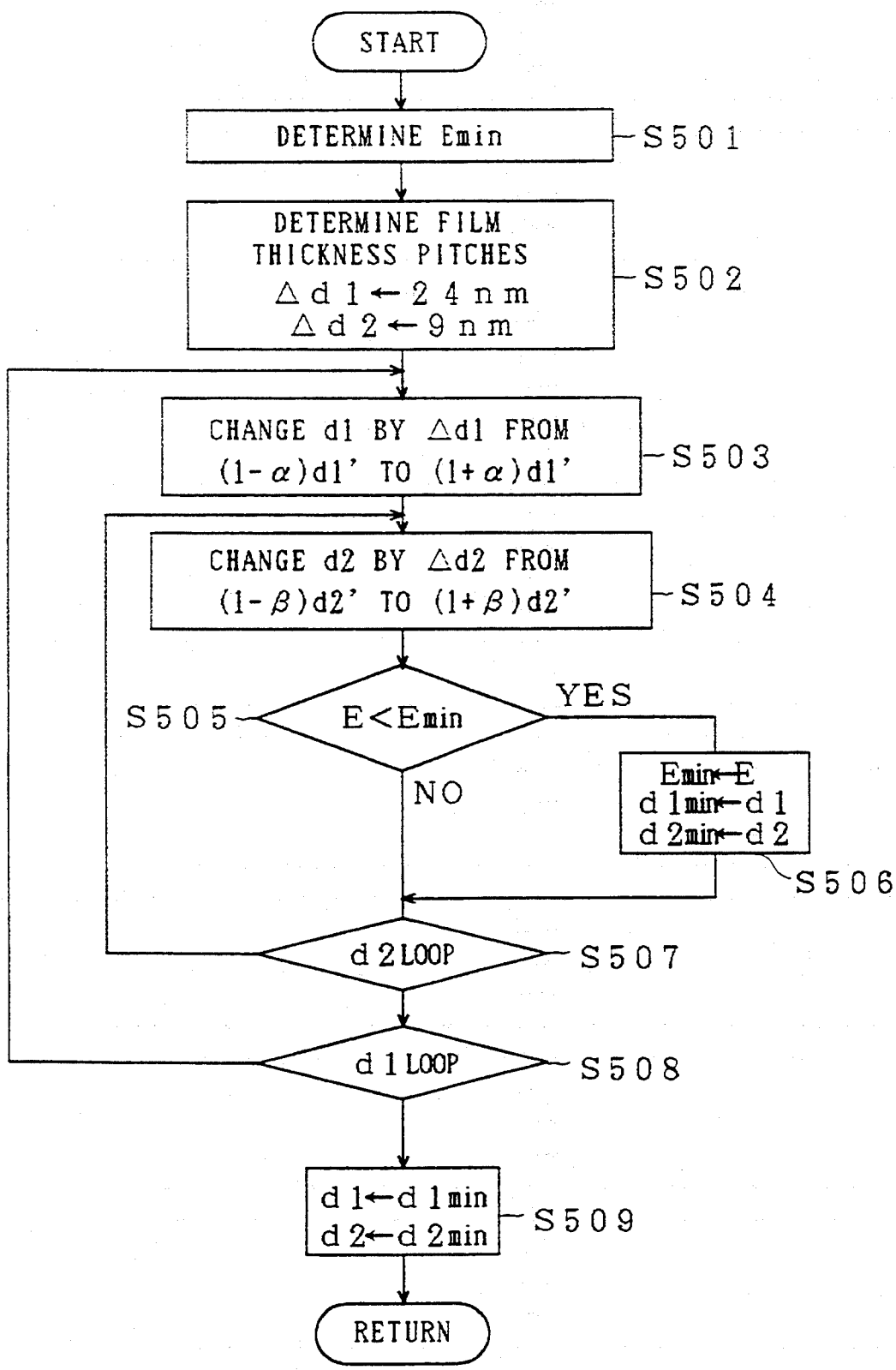
FIG. 11 is a flow chart showing computation steps for finding a combination of the film thicknesses (d1, d2) which has the smallest deviation.

FIG. 11 is a flow chart showing computation steps for finding the combination of the thicknesses (d1, d2) which corresponds to the smallest deviation E. In the following the computation steps will be described.

First, a deviation Emin is set at Step S501 and the film thickness pitches $\Delta d1$ and $\Delta d2$ are set at Step S502. Although it is desirable to take measurements from various multilayered sample objects OB and determine an appropriate value for the deviation Emin based on the measurements, the deviation Emin may be simply set at a sufficiently large value. With respect to the film thickness pitches $\Delta d1$ and $\Delta d2$, it is preferable to take a computation time into consideration in determining the film thickness pitches $\Delta d1$ and $\Delta d2$. In this embodiment, the film thickness pitch $\Delta d1$ is determined as 24 nm while the film thickness pitch $\Delta d2$ is determined as 9 nm for the reason described below.

Too small film thickness pitches $\Delta d1$ and $\Delta d2$ will prolong the computation time. Therefore, the film thickness pitches $\Delta d1$ and $\Delta d2$ need to be set at reasonably large values which will not inconveniently extend the computation time. For instance, in an interference waveform which is derived for irradiation of light of 550 nm to 900 nm upon a sample which consists simply of a silicon oxide film (SiO2) and an underlying silicon body, the total number m of peaks (or valleys) appearing in the waveform is calculated as an approximate value by:

$$m = 4 \times n \times d \times \frac{900 - 550}{900 \times 550} \quad (5)$$

where
n: an average refractive index of the silicon oxide film with respect to light of 550 nm to 900 nm
d: the thickness of the silicon oxide film As can be seen from Eq. 5, the total number m varies with the thickness d. Therefore, when the film thickness pitch $\Delta d1$ is large, a change in the total number m can in some cases make it impossible to find a minimum deviation E. To prevent this, the film thickness pitch Δd1 is determined as one-tenth of a change in the film thickness which is needed to increase or decrease the total number m by 1. In other words, the film thickness pitch Δd1 is set as:

$$\Delta d1 = \frac{0.1}{4 \times 1.45 \times \frac{900 - 550}{900 \times 550}} \quad (6)$$
$$= 24 \text{ (nm)}$$

In a similar manner, the film thickness pitch Δd2 is set as:

$$\Delta d2 = \frac{0.1}{4 \times 4.00 \times \frac{900 - 550}{900 \times 550}} \quad (7)$$
$$= 8.8 \text{ (nm)}$$

Having set the deviation Emin and the film thickness pitches Δd1 and Δd2, the sequence proceeds to Step S503 at which the thickness d1 is changed by the film thickness pitch Δd1 in the range from $(1-\alpha) \times d1'$ to $(1+\alpha) \times d1'$. At Step S504, the thickness d2 is changed by the film thickness pitch Δd2 in the range from $(1-\beta) \times d2'$ to $(1+\beta) \times d2'$. In this embodiment, the constants $\alpha$ and $\beta$ are both 0.25.

After computing a deviation E between the theoretical and measured spectral reflection ratios with respect to the assumed film thicknesses d1, d2 and d3, it is judged at Step S505 whether the computed deviation E is smaller than the deviation Emin. If "YES" at Step S505, the sequence proceeds to Step S506 and replace the deviation Emin with the deviation E and the film thicknesses d1' and d2' with the assumed film thicknesses d1 and d2. That is, if the newly computed deviation is smaller than the former deviation, the computed deviation E and the assumed film thicknesses d1 and d2 are maintained. This process (Step S505 and Step S506) is repeated until it is judged that a computation loop is completed at Step S507 and Step S508. Thus, a combination of the film thicknesses (d1min, d2min) which causes the deviation E to be minimum is found.

Following this, the film thickness values d1 and d2 are replaced with the film thickness values d1min and d2min at Step S509.

(6) At Step S6 (FIG. 2), from the combination of the film thicknesses (d1, d2), more accurate combination of the film thicknesses of the silicon oxide film 1 and the silicon film 2 is found by nonlinear optimization (e.g., Gauss-Newton method). The Gauss-Newton method is a conventional method and will not be therefore described here. A wavelength range for optimization may be from 550 nm to 900 nm, for instance.

(7) At Step S7 (FIG. 2), quadratic surface approximation is performed utilizing the least square method. From a resultant quadratic surface function, the thicknesses d1 and d2 which cause the deviation E to have a minimum value is identified.

Figure 12:
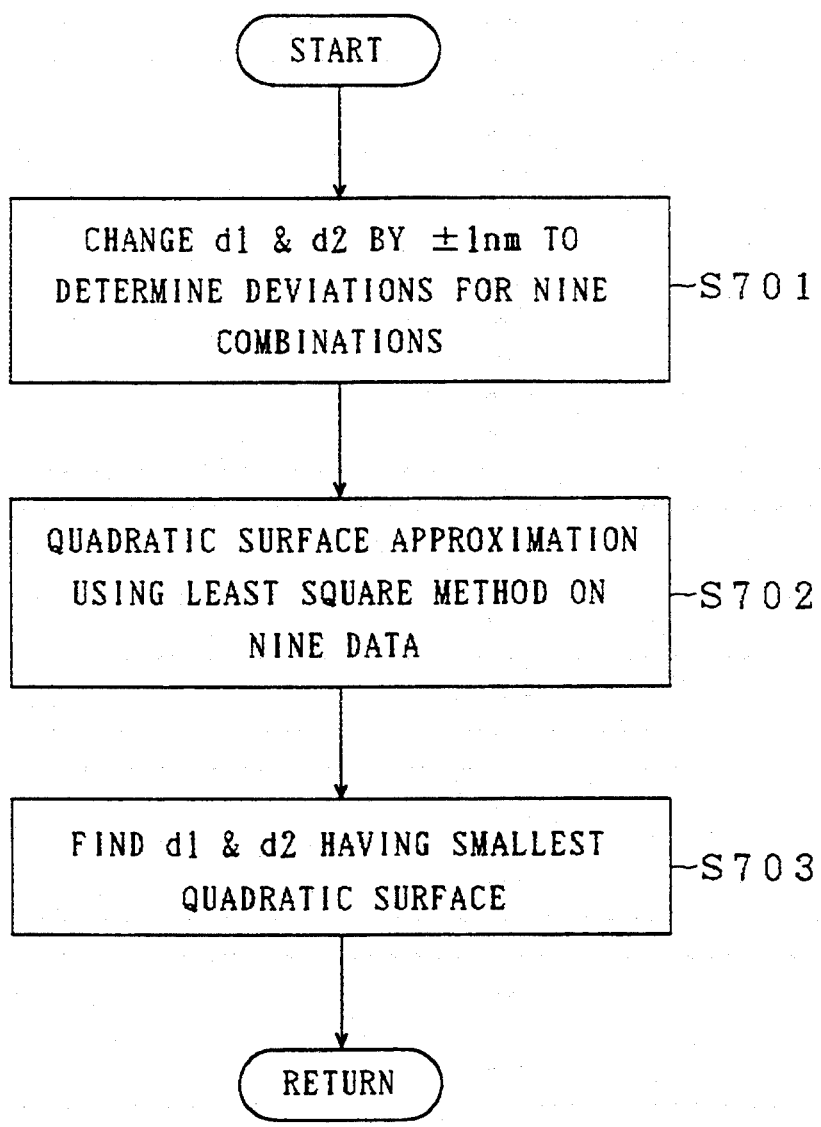
FIG. 12 is a flow chart showing computation steps for calculating the film thicknesses d1 and d2 by quadratic surface approximation utilizing the least square method.

FIG. 12 is a flow chart showing computation steps for finding the thicknesses d1 and d2 by quadratic surface approximation utilizing the least square method. First, at Step S701, the thickness d1 of the silicon oxide film 1 and the thickness d2 of the silicon film 2 are each increased or decreased by a very small amount (1 nm, for instance) and nine combinations of the film thicknesses (d1, d2, d3) are tentatively determined. Deviations E between the theoretical and measured spectral reflection ratios with respect to the tentatively determined film thicknesses are then calculated (Table 1).

TABLE 1

|  | d1 − 1 | d1 | d1 + 1 |
|---|---|---|---|
| d2 − 1 | E (λ1, λ2; d1 − 1, d2 − 1, d3) | E (λ1, λ2; d1, d2 − 1, d3) | E (λ1, λ2; d1 + 1, d2 − 1, d3) |
| d2 | E (λ1, λ2; d1 − 1, d2, d3) | E (λ1, λ2; d1, d2, d3) | E (λ1, λ2; d1 + 1, d2, d3) |
| d2 + 1 | E (λ1, λ2; d1 − 1, d2 + 1, d3) | E (λ1, λ2; d1, d2 + 1, d3) | E (λ1, λ2; d1 + 1, d2 + 1, d3) |

At Step 702, the computed deviations E are approximated by quadratic surface approximation utilizing the least square method, thereby establishing a quadratic surface function as below:

$$E = A \times (d1)^2 + B \times (d2)^2 + C \times (d1) \times (d2) + D \times (d1) + E \times (d2) + F \quad (8)$$

where the symbols A to F are constants.

At Step 703, from the quadratic surface function, a combination (d1, d2) which corresponds to the smallest deviation E is found, which is to calculate the minimum value for the deviation E. If the deviation E is partially differentiated by the thickness d1 or d2 and a resultant solution is zero, the deviation E has the minimum value E.

$$\frac{\partial E}{\partial d1} = 0 \quad (9)$$

$$\frac{\partial E}{\partial d2} = 0 \quad (10)$$

Hence, from Eqs. 9 and 10, $$2 \times A \times (d1) + C \times (d1) + D = 0 \quad (11)$$

$$2 \times B \times (d2) + C \times (d2) + E = 0 \quad (12)$$

The values of the film thicknesses d1 and d2 causing the deviation E to have the minimum value are calculated by solving these simultaneous equations Eqs. 11 and 12. Thus, the film thicknesses are measured at an improved accuracy in this manner.

(8) Next, at Step S8 (FIG. 2), the thicknesses d1, d2 and d3 calculated in the manner above are substituted in Eq. 3 to calculate the deviation E. It is then judged whether the deviation E thus calculated is smaller than a tolerable value. If "NO" at Step S8, the sequence returns to Step S7 to redetermine a combination of the film thicknesses (d1, d2).

(9) If "YES" at Step S8, the CRT 51 displays the film thickness d1 of the silicon oxide film 1, the film thickness d2 of the silicon film 2 and the film thickness d3 of the silicon oxide film 3 (Step 9). This completes the sequence.

As heretofore described, according to this embodiment, the approximate film thickness d2' of the silicon film 2 is calculated at Step S3 and the approximate film thickness d1' of the silicon oxide film 1 is calculated at Step S4, and thereafter the film thicknesses d1 and d2 are calculated from the approximate film thicknesses d1' and d2'. Hence, it is not necessary to input the ranges of the film thicknesses before measuring the film thicknesses. Further, the total number of the computation steps is reduced, thereby substantially reducing the computation time.

Figure 16:
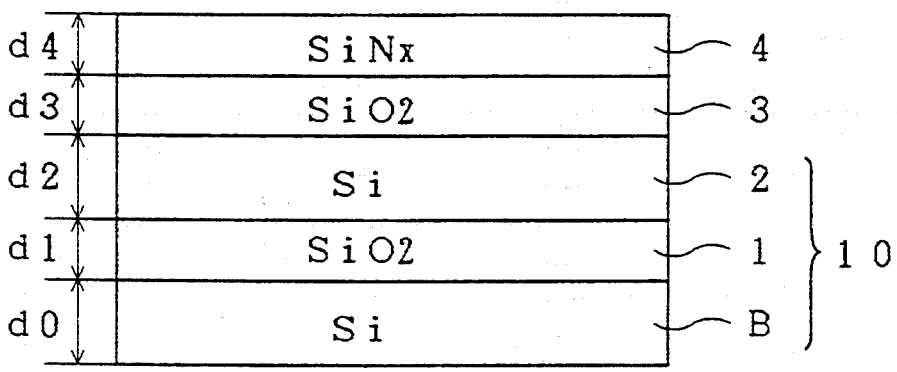

Although the preferred embodiment above relates only to measurement of the film thicknesses d1, d2 and d3 of a multilayered sample object OB in which merely the silicon oxide film 3 is disposed on the SOI substrate 10 (FIG. 15), the present invention is also applicable to measurement of film thicknesses of a multilayered sample object OB in which the silicon oxide film 3 and a silicon nitride film 4 are formed on the SOI substrate 10 (See FIG. 16). Such measurement is similar to the measurement according to the embodiment above except for the computation steps for calculating the film thickness of the film which is formed on the SOI substrate 10 (namely the silicon oxide film 3 in the embodiment above). In the following, a method of measuring film thicknesses d1, d2, d3 and d4 of a multilayered sample object OB as that shown in FIG. 16 will be described. Description will be given mainly on computation steps for calculating the film thicknesses of the silicon oxide film 3 and the silicon nitride film 4 which are disposed on the SOI substrate 10.

First, as in the embodiment above, spectral reflection ratios Rm ($\lambda$) of a silicon substrate with respect to a wavelength range from 200 nm to 1,000 nm are measured. From spectral reflection ratios Rm ($\lambda$) of the first wavelength range (i.e., ultraviolet range), the film thickness d3 of the silicon oxide film 3 and the film thickness d4 of silicon nitride film 4 which are formed on the SOI substrate are calculated.

Figure 13:
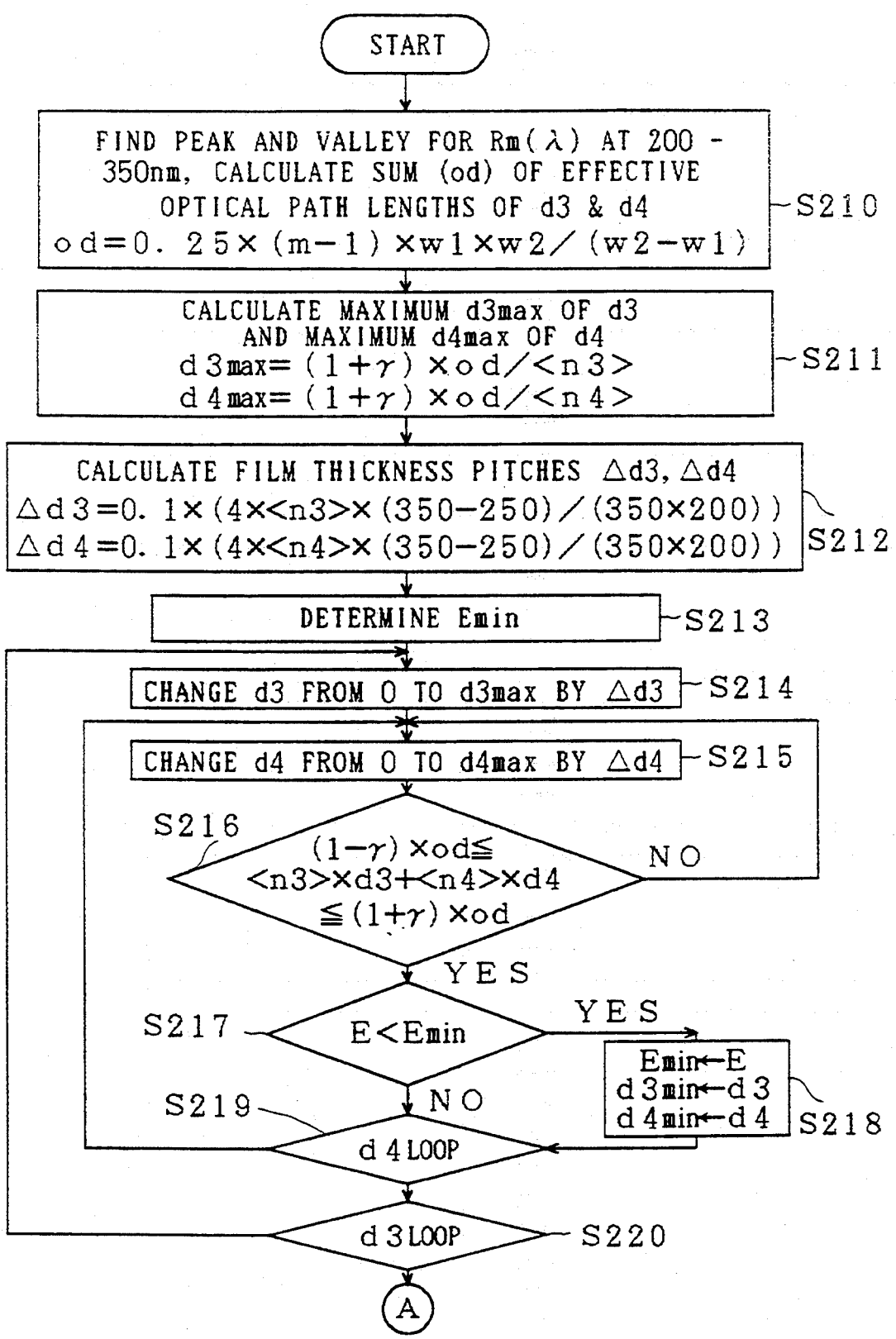
FIGS. 13 and 14 are flow charts showing a method of measuring a film thickness according to other preferred embodiment of the present invention.
Figure 14:
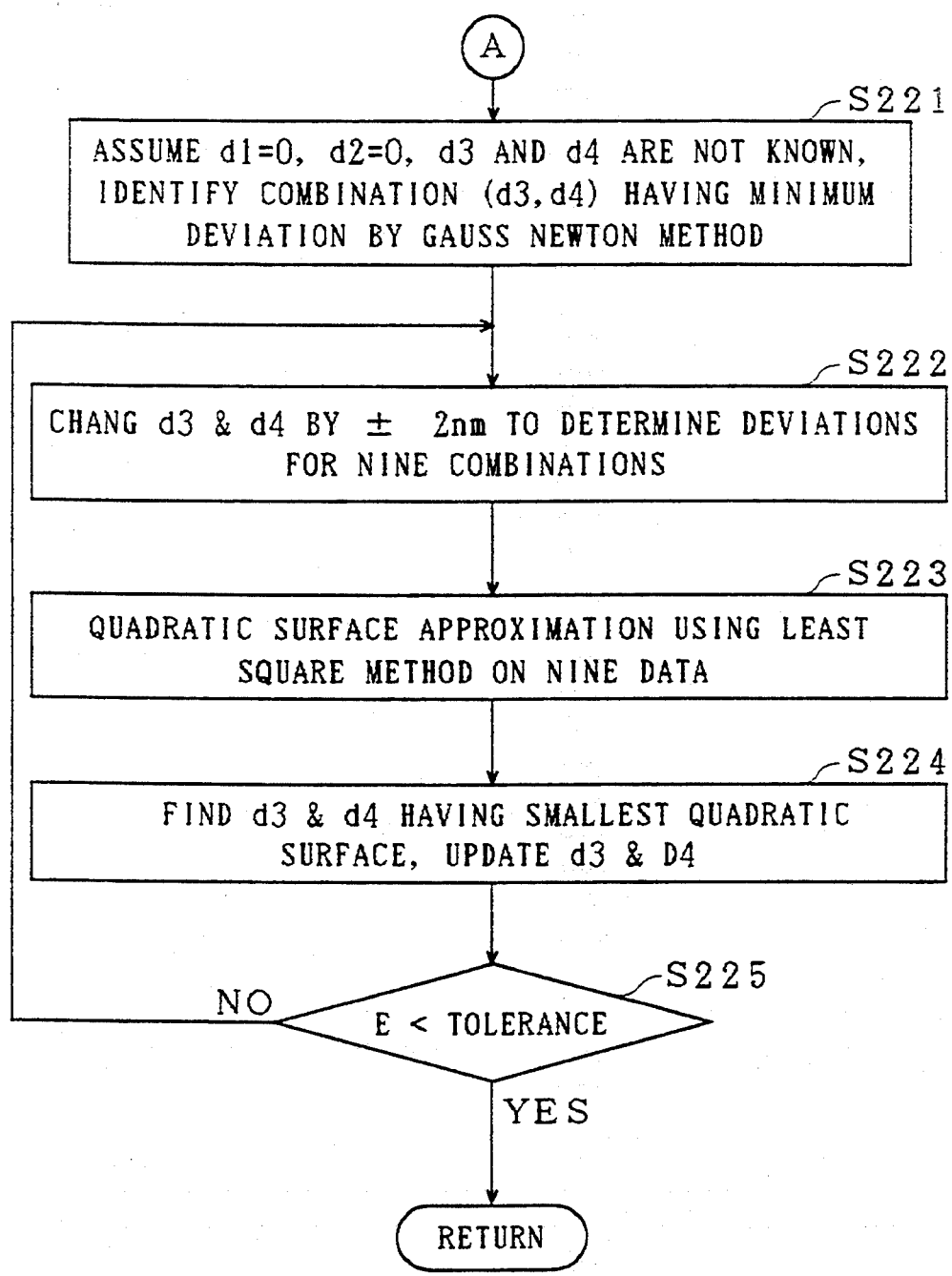

FIGS. 13 and 14 are flow charts showing computation steps for calculating the film thicknesses d3 and d4 of the multilayered sample object OB in which the silicon oxide film 3 and the silicon nitride film 4 are formed on the SOI substrate 10. At Step S210, a peak and a valley of the waveform, which is obtained by plotting the spectral reflection ratios Rm ($\lambda$), in the first wavelength range (200 nm to 350 nm) are identified, and the sum od of the effective optical path lengths of the film thicknesses d3 and d4 is calculated by Eq. 13 below:

$$od = 0.25 \times (m - 1) \times \frac{w1 \times w2}{w2 - w1} \qquad (13)$$

Next, at Step S211, the maximum value d3max for the film thickness d3 of the silicon oxide film 3 is calculated from Eq. 14.

$$d3\text{max} = (1 + \gamma) \times \frac{od}{<n3>} \qquad (14)$$

where
<n3>: an average refractive index of the silicon oxide film 3 with respect to first wavelength range
$\gamma$: safety factor (described later)
From Eq. 15, the maximum value d4max for the film thickness d4 of the silicon nitride film 4 is calculated.

$$d4\text{max} = (1 + \gamma) \times \frac{od}{<n4>} \qquad (15)$$

where
<n4>: an average refractive index of the silicon nitride film 4 with respect to first wavelength range
The reason why the maximum values d3max and d4max can be calculated from Eqs. 14 and 15 is because there are only a limited number of possible combinations of the film thicknesses d3 and d4 once the sum od of the effective optical path lengths of the film thicknesses d3 and d4 is known. In other words, a combination (d3, d4) is determined by finding the film thicknesses d3 and d4 which satisfy:

$$(1-y) \times od \leq (<n3> \times d3 + <n4> \times d4) \leq (1+\gamma) \times od \qquad (16)$$

where $\gamma$, the safety factor regarding differences between measurements and calculated values (due to the NA and the refractive index of the objective lens, noise, etc.), is equal to or larger than 0 but smaller than 1. In this embodiment, $\gamma = 0.2$.

At Step S212, film thickness pitches $\Delta d3$ and $\Delta d4$ are determined. The film thickness pitches $\Delta d3$ and $\Delta d4$ are set at the most appropriate values in the manner as that in Step S502.

After setting the deviation Emin (Step S213), the film thickness d3 is changed by the pitch $\Delta d3$ within a range from zero to the value d3max at Step S214 while the film thickness d4 is changed by the pitch $\Delta d4$ within a range from zero to the value d4max at Step S215. During this, it is judged at Step S216 whether Inequality 16 is satisfied. At Step 217, deviations E between the theoretical and the measured spectral reflection ratios are computed with respect to the film thicknesses d1 (=0), d2 (=0), d3 and d4, and it is judged whether the computed deviations E are each smaller than the deviation Emin.

If "YES" at Step S217, the sequence proceeds to Step S218 at which the deviation Emin is replaced with the computed deviation E and the film thicknesses d3min and d4min are replaced with the assumed film thicknesses d3 and d4. This process (Step S216, Step S217 and Step S218) is repeated until it is judged at Step S219 and Step S220 that a computation loop is completed. A combination of the film thicknesses (d3min, d4min) which causes the deviation E to be minimum is found in this manner.

The film thicknesses d3min and d4min are then replaced with the film thicknesses d3 and d4. From the combination of the film thicknesses (d3, d4) thus found, more accurate combination of the film thicknesses (d3, d4) is found by nonlinear optimization (e.g., Gauss-Newton method) (Step S221).

At Steps S222 to S224, quadratic surface approximation is performed utilizing the least square method. From the resultant quadratic surface function, the thicknesses d3 and d4 which allow the deviation E between the theoretical and measured spectral reflection ratios to be minimum are identified. More specifically, the film thickness d3 of the silicon oxide film 3 and the film thickness d4 of the silicon nitride film 4 are each increased or decreased by a very small amount (2 nm, for example) at Step S222 so that nine different combinations (0, 0, d3, d4) are determined with respect to the thicknesses d3 and d4. Deviations E between the theoretical and measured spectral reflection ratios are then calculated for the respective combinations (Table 2).

TABLE 2

|  | d4 − 2 | d4 | d4 + 2 |
|---|---|---|---|
| d3 − 2 | E ($\lambda$1, $\lambda$2; 0, 0, d3 − 2, d4 − 2) | E ($\lambda$1, $\lambda$2; 0, 0, d3 − 2, d4) | E ($\lambda$1, $\lambda$2; 0, 0, d3 − 2, d4 + 2) |
| d3 | E ($\lambda$1, $\lambda$2; 0, 0, d3, d4 − 2) | E ($\lambda$1, $\lambda$2; 0, 0, d3, d4) | E ($\lambda$1, $\lambda$2; 0, 0, d3, d4 + 2) |
| d3 + 2 | E ($\lambda$1, $\lambda$2; 0, 0, d3 + 2, d4 − 2) | E ($\lambda$1, $\lambda$2; 0, 0, d3 + 2, d4) | E ($\lambda$1, $\lambda$2; 0, 0, d3 + 2, d4 + 2) |

From the deviations E thus calculated, a quadratic surface function is established by quadratic surface approximation utilizing the least square method (Step S223). From the quadratic surface function, a combination of the thicknesses (d3, d4) corresponding to the minimum deviation E is found. The value of the film thickness d3 and the value of the film thickness d4 are then updated (Step S224).

At Step S225, a deviation E of where the film thicknesses are d1 (=0), d2 (=0), d3 and d4 is calculated. It is then judged whether the calculated deviation E is smaller than the tolerable value. If "NO," the sequence returns to Step S222 to determine the combination (d3, d4) once again.

The computation steps of FIGS. 13 and 14 are subsequently performed, thereby accurately calculating the film thickness d3 and the film thickness d4.

Once the film thicknesses d3 and d4 are calculated, Steps S3 to S8 are preformed as in the precedent embodiment to calculate the film thickness d1 of the silicon oxide film 1 and the film thickness d2 of the silicon film 2. Finally, the film thicknesses d1, d2, d3 and d4 are displayed on the CRT 51.

Thus, as in the precedent embodiment, the film thicknesses of the two different layers (the silicon oxide film 3 and the silicon nitride film 4) which are formed on the SOI substrate 10 are measured without preliminarily inputting the film thickness ranges. Equally advantageously, the total number of the computation steps is reduced, and therefore, the computation time is substantially reduced.

Although in the embodiment described just above relates to where the layers which are formed on the SOI substrate 10 are the silicon oxide film 3 and the silicon nitride film 4, the present invention is not limited to these particular films. Rather, the present invention is generally applicable to any other transparent films. In addition, although the foregoing has described that the SOI substrate 10 consists of the silicon body B, the silicon oxide film 1 and the silicon film 2, the silicon oxide film 1 may be other transparent insulation film.

Further, Step S7, which requires to perform quadratic surface approximation to improve the accuracy of the optimized values of the thicknesses d1 and d2, is not requisite.

Still further, spectral reflectance may be used instead of spectral reflection ratios which are in the embodiments above the ratios of the energies of the spectrum components of the multilayered sample object OB to the energies of the spectrum components of the calibration wafer (i.e., silicon substrate).

Still further, although deviations E are calculated with respect to nine combinations of the film thicknesses to subsequently perform quadratic surface approximation at Step S7 or at S224, as far as deviations E are determined with respect to at least six combinations, it is possible to develop the quadratic surface function, and hence, to update the film thicknesses d1 and d2.

While the invention has been described in detail, the foregoing description is in all aspects illustrative and not restrictive. It is understood that numerous other modifications and variations can be devised without departing from the scope of the invention.

The invention claimed is:

1. A method of measuring thicknesses d1, d2 and d3 of a transparent insulation film, a silicon film and a transparent film, respectively, of a multilayered sample object which is formed by disposing said transparent film on an SOI substrate which is comprised of a body, said transparent insulation film and said silicon film, said method comprising:

a first step of irradiating said multilayered sample object with light of first and second wavelength ranges to thereby measure spectral reflectance, said first wavelength range being a ultraviolet range, said second wavelength range including longer wavelengths than the ultraviolet range;

a second step of calculating the thickness d3 of said transparent film from the measured spectral reflectance of the first wavelength range;

a third step of calculating reflectance against wave numbers at equal wave number intervals from the measured spectral reflectance of the second wavelength range, and frequency converting the calculated reflectance to thereby develop a frequency converted spectrum;

a fourth step of obtaining a power spectrum from the frequency converted spectrum to find a peak which expresses interference caused by said silicon film in the power spectrum, and calculating an approximate value d2' of the thickness of said silicon film based on the location of the peak and an average refractive index of silicon in a wave number space;

a fifth step of eliminating periodic components corresponding to a certain effective optical path or longer paths in the frequency converted spectrum by low-pass filtering to thereby obtain a filtered frequency converted spectrum, then calculating intermediate spectral reflectance against wavelengths at equal wavelength intervals from the filtered frequency converted spectrum, then theoretically deriving theoretical spectral reflectance of when only said transparent film of the thickness d3 is formed on a silicon layer, the thickness d3 being a value which is calculated at said second step, then subtracting the theoretical spectral reflectance from the intermediate spectral reflectance to thereby obtain final spectral reflectance for the second wavelength range and then calculating an approximate value d1' of the thickness of said transparent insulation film from the final spectral reflectance;

a sixth step of changing the thicknesses d1 and d2 from said approximate values d1' and d2' each by a fixed amount and calculating deviations between the theoretical spectral reflectance and the measured spectral reflectance with respect to the thicknesses d1, d2 and d3 to thereby find a combination (d1, d2) having the minimum deviation, the thickness d3 being a value which is calculated at said second step; and a seventh step of performing nonlinear optimization on the thicknesses d1 and d2 of said combination (d1, d2) which is found at said sixth step, thereby finally determining the thicknesses d1 and d2 as the thicknesses of said transparent insulation film and said silicon film.

2. The method of claim 1, further comprising an eighth step of increasing or decreasing the thicknesses d1 and d2 each by a predetermined amount to tentatively determine six or more different combinations (d1, d2, d3) of the thicknesses, calculating deviations between the theoretical spectral reflectance and the measured spectral reflectance with respect to said six or more combinations, approximating the deviations by quadratic surface approximation utilizing the least square method to develop a quadratic surface function, and thereby finding and determining the thicknesses d1 and d2 which allow the deviation to be minimum as the thicknesses of said transparent insulation film and said silicon film, wherein said eighth step is repeated until the deviation between the theoretical spectral reflectance with respect to the thicknesses d1 and d2 calculated at said eighth step and the thickness d3 calculated at said second step and the measured spectral reflectance calculated at said first step becomes smaller than a certain value.

3. The method of claim 1, wherein said nonlinear optimization is a Gauss-Newton method.

4. A method of measuring thicknesses d1, d2, d3 and d4 of a transparent insulation film, a silicon film and first and second transparent films, respectively, of a multilayered sample object which is formed by disposing said first and said second transparent films in this order on an SOI substrate which is comprised of a body, said transparent insulation film and said silicon film, said method comprising:

a first step of irradiating said multilayered sample object with light of first and second wavelength ranges to thereby measure spectral reflectance, said first wavelength range being a ultraviolet range, said second wavelength range including longer wavelengths than the ultraviolet range;

a second step of calculating the sum of effective optical path lengths of said first and said second transparent films from the measured spectral reflectance of said first wavelength range to find the maximum values d3max and d4max of the thicknesses d3 and d4, then tentatively determining the thicknesses d1 and d2 both as zero, then changing the thicknesses d3 and d4 each by a fixed amount from zero to said maximum values d3max and d4max to calculate deviations between theoretical spectral reflectance and the measured spectral reflectance with respect to the thicknesses d1, d2, d3 and d4, then finding a combination (d3, d4) having the minimum deviation, and thereafter performing nonlinear optimization on the thicknesses d3 and d4 of said combination (d3, d4) and finally determining the thicknesses d3 and d4 as the thicknesses of said first and said second transparent films;

a third step of calculating reflectance against wave numbers at equal wave number intervals from the measured spectral reflectance of said second wavelength range and frequency converting the calculated reflectance to thereby develop a frequency converted spectrum;

a fourth step of obtaining a power spectrum from the frequency converted spectrum to find a peak which expresses interference caused by said silicon film in the power spectrum, and calculating an approximate value d2' of the thickness of said silicon film based on the location of the peak and an average refractive index of silicon in a wave number space;

a fifth step of eliminating periodic components corresponding to a certain effective optical path or longer paths in the frequency converted spectrum by low-pass filtering to thereby obtain a filtered frequency converted spectrum, then calculating intermediate spectral reflectance against wavelengths at equal wavelength intervals from the filtered frequency converted spectrum, then theoretically deriving theoretical spectral reflectance of when only said transparent film of the thickness d3 is formed on a silicon layer, the thickness d3 being a value which is calculated at said second step, then subtracting the theoretical spectral reflectance from the intermediate spectral reflectance to thereby obtain final spectral reflectance for the second wavelength range and then calculating an approximate value d1' of the thickness of said transparent insulation film from the final spectral reflectance;

a sixth step of changing the thicknesses d1 and d2 from said approximate values d1' and d2' each by a fixed amount, and calculating deviations between the theoretical spectral reflectance and the measured spectral reflectance with respect to the thicknesses d1, d2, d3 and d4 to thereby find a combination (d1, d2) having the minimum deviation; and a seventh step of performing nonlinear optimization on the thicknesses d1 and d2 of said combination (d1, d2) which is found at said sixth step, thereby finally determining the thicknesses d1 and d2 as the thicknesses of said transparent insulation film and said silicon film.

5. The method of claim 4, further comprising an eighth step of tentatively determining the thicknesses d3 and d4 both as zero, then increasing or decreasing the thicknesses d3 and d4 each by a predetermined amount to tentatively determine six or more different combinations (d1, d2, d3, d4) of the thicknesses, then calculating deviations between the theoretical spectral reflectance and the measured spectral reflectance with respect to said six or more combinations, then approximating the deviations by quadratic surface approximation utilizing the least square method to develop a quadratic surface function, and thereby finding and determining the thicknesses d3 and d4 which allow the deviation to be minimum as the thicknesses of said first and said second transparent films, wherein said eighth step is repeatedly performed after said second step and before said fourth step until the deviation between the theoretical spectral reflectance with respect to the thicknesses d1 and d2 which are both zero and the thicknesses d3 and d4 having such values which are calculated at said eighth step and the measured spectral reflectance calculated at said first step becomes smaller than a certain value.

6. The method of claim 4, further comprising a ninth step of increasing or decreasing the thicknesses d1 and d2 each by a predetermined amount to tentatively determine six or more different combinations (d1, d2, d3) of the thicknesses, then calculating deviations between the theoretical spectral reflectance and the measured spectral reflectance with respect to said six or more combinations, then approximating the deviations by quadratic surface approximation utilizing the least square method to develop a quadratic surface function, and thereby finding and determining the thicknesses d1 and d2 which allow the deviation to be minimum as the thicknesses of said transparent insulation film and said silicon film, wherein said ninth step is repeated until the deviation between the theoretical spectral reflectance with respect to the thicknesses d1 and d2 calculated at said ninth step and the thicknesses d3 and d4 calculated at said second step and the measured spectral reflectance calculated at said first step becomes smaller than a certain value.

7. The method of claim 4, wherein said nonlinear optimization is a Gauss-Newton method.

* * * * *